United States Patent
Spaur et al.

(10) Patent No.: US 10,231,125 B2
(45) Date of Patent: *Mar. 12, 2019

(54) SECURE TELEMATICS

(71) Applicant: Cellport Systems, Inc., Boulder, CO (US)

(72) Inventors: Charles W. Spaur, Aurora, CO (US); Michael F. Braitberg, Boulder, CO (US); Patrick J. Kennedy, Boulder, CO (US)

(73) Assignee: CYBERCAR INC., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/336,379

(22) Filed: Oct. 27, 2016

(65) Prior Publication Data

US 2017/0048711 A1  Feb. 16, 2017

Related U.S. Application Data

(63) Continuation of application No. 14/819,141, filed on Aug. 5, 2015, now Pat. No. 9,668,133, which is a (Continued)

(51) Int. Cl.
*H04W 12/06* (2009.01)
*B60R 25/01* (2013.01)
(Continued)

(52) U.S. Cl.
CPC ........... *H04W 12/06* (2013.01); *B60R 25/01* (2013.01); *B60R 25/04* (2013.01);
(Continued)

(58) Field of Classification Search
None
See application file for complete search history.

(56) References Cited

U.S. PATENT DOCUMENTS

| | | |
|---|---|---|
| 4,697,281 A | 9/1987 | O'Sullivan |
| 4,718,080 A | 1/1988 | Serrano et al. |

(Continued)

FOREIGN PATENT DOCUMENTS

| | | |
|---|---|---|
| DE | 2051747 | 7/1971 |
| DE | 4032198 | 4/1992 |

(Continued)

OTHER PUBLICATIONS

U.S. Appl. No. 08/957,652, filed Oct. 24, 1997, Bentley.
(Continued)

*Primary Examiner* — Kaveh Abrishamkar
(74) *Attorney, Agent, or Firm* — Sheridan Ross P.C.

(57) ABSTRACT

A telematics system that includes a security controller is provided. The security controller is responsible for ensuring secure access to and controlled use of resources in the vehicle. The security measures relied on by the security controller can be based on digital certificates that grant rights to certificate holders, e.g., application developers. In the case in which applications are to be used with vehicle resources, procedures are implemented to make sure that certified applications do not jeopardize vehicle resources' security and vehicle users' safety. Relationships among interested entities are established to promote and support secure vehicle resource access and usage. The entities can include vehicle makers, communication service providers, communication apparatus vendors, vehicle subsystem suppliers, application developers, as well as vehicle owners/users. At least some of the entities can be members of a federation established to enhance and facilitate secure access and usage of vehicle resources.

20 Claims, 8 Drawing Sheets

Related U.S. Application Data continuation of application No. 14/042,246, filed on Sep. 30, 2013, now Pat. No. 9,130,930, which is a continuation of application No. 12/017,467, filed on Jan. 22, 2008, now Pat. No. 8,719,592, which is a continuation of application No. 10/767,548, filed on Jan. 28, 2004, now Pat. No. 7,366,892.

(60) Provisional application No. 60/443,505, filed on Jan. 28, 2003.

(51) Int. Cl.
  B60R 25/20 (2013.01)
  B60R 25/04 (2013.01)
  B60R 25/10 (2013.01)
  B60R 25/25 (2013.01)
  B60R 25/33 (2013.01)
  G06F 21/62 (2013.01)
  H04L 29/06 (2006.01)
  B60R 25/24 (2013.01)
  H04L 9/32 (2006.01)
  G07C 5/00 (2006.01)
  G07C 5/08 (2006.01)

(52) U.S. Cl.
  CPC .......... *B60R 25/1001* (2013.01); *B60R 25/20* (2013.01); *B60R 25/209* (2013.01); *B60R 25/241* (2013.01); *B60R 25/25* (2013.01); *B60R 25/252* (2013.01); *B60R 25/255* (2013.01); *B60R 25/257* (2013.01); *B60R 25/33* (2013.01); *G06F 21/6236* (2013.01); *H04L 9/3263* (2013.01); *H04L 63/0823* (2013.01); *H04L 63/0861* (2013.01); *H04L 63/102* (2013.01); *B60R 2325/10* (2013.01); *B60R 2325/101* (2013.01); *B60R 2325/202* (2013.01); *B60R 2325/205* (2013.01); *G07C 5/008* (2013.01); *G07C 5/085* (2013.01); *H04L 2209/80* (2013.01); *H04L 2209/84* (2013.01); *H04L 2463/082* (2013.01)

(56) References Cited

U.S. PATENT DOCUMENTS

| | | |
|---|---|---|
| 4,792,986 A | 12/1988 | Garner et al. |
| 4,837,800 A | 6/1989 | Freeburg et al. |
| 4,887,265 A | 12/1989 | Felix |
| 4,890,315 A | 12/1989 | Bendixen et al. |
| 4,972,457 A | 11/1990 | O'Sullivan |
| 4,977,609 A | 12/1990 | McClure |
| 4,989,146 A | 1/1991 | Imajo |
| 4,989,230 A | 1/1991 | Gillig et al. |
| 5,020,090 A | 5/1991 | Morris |
| 5,029,233 A | 7/1991 | Metroka |
| 5,046,187 A | 9/1991 | Takahashi |
| 5,048,117 A | 9/1991 | Aisaka et al. |
| 5,054,115 A | 10/1991 | Sawa et al. |
| 5,081,667 A | 1/1992 | Drori et al. |
| 5,095,480 A | 3/1992 | Fenner |
| 5,095,503 A | 3/1992 | Kowalski |
| 5,109,402 A | 4/1992 | Anderson et al. |
| 5,119,397 A | 6/1992 | Dahlin et al. |
| 5,127,041 A | 6/1992 | O'Sullivan |
| 5,146,486 A | 9/1992 | Lebowitz |
| 5,148,473 A | 9/1992 | Freeland et al. |
| 5,189,734 A | 2/1993 | Bailey et al. |
| 5,203,012 A | 4/1993 | Patsiokas et al. |
| 5,212,722 A | 5/1993 | Murata |
| 5,214,774 A | 5/1993 | Welsch et al. |
| 5,235,595 A | 8/1993 | O'Dowd |
| 5,237,570 A | 8/1993 | Smolinske et al. |
| 5,260,988 A | 11/1993 | Schellinger et al. |
| 5,274,837 A | 12/1993 | Childress et al. |
| 5,276,703 A | 1/1994 | Budin et al. |
| 5,276,908 A | 1/1994 | Koohgoli et al. |
| 5,287,541 A | 2/1994 | Davis et al. |
| 5,293,635 A | 3/1994 | Faulk, Jr. et al. |
| 5,297,142 A | 3/1994 | Paggeot et al. |
| 5,301,359 A | 4/1994 | Van den Heuvel et al. |
| 5,331,634 A | 7/1994 | Fischer |
| 5,331,635 A | 7/1994 | Ota |
| 5,333,177 A | 7/1994 | Braitberg et al. |
| 5,347,272 A | 9/1994 | Ota |
| 5,353,023 A | 10/1994 | Mitsugi |
| 5,371,734 A | 12/1994 | Fischer |
| 5,408,684 A | 4/1995 | Yunoki et al. |
| 5,428,636 A | 6/1995 | Meier |
| 5,442,553 A | 8/1995 | Parrillo |
| 5,442,633 A | 8/1995 | Perkins et al. |
| 5,445,347 A | 8/1995 | Ng |
| 5,446,736 A | 8/1995 | Gleeson et al. |
| 5,455,347 A | 10/1995 | Maekawa et al. |
| 5,459,660 A | 10/1995 | Berra |
| 5,475,864 A | 12/1995 | Hamabe |
| 5,475,868 A | 12/1995 | Duque-Anton et al. |
| 5,479,479 A | 12/1995 | Braitberg et al. |
| 5,483,524 A | 1/1996 | Lev et al. |
| 5,491,690 A | 2/1996 | Alfonsi et al. |
| 5,506,888 A | 4/1996 | Hayes et al. |
| 5,509,123 A | 4/1996 | Dobbins et al. |
| 5,513,379 A | 4/1996 | Benveniste et al. |
| 5,515,043 A | 5/1996 | Berard et al. |
| 5,519,621 A | 5/1996 | Wortham |
| 5,519,884 A | 5/1996 | Duque-Anton et al. |
| 5,526,404 A | 6/1996 | Wiedeman et al. |
| 5,530,701 A | 6/1996 | Stillman et al. |
| 5,535,274 A | 7/1996 | Braitberg et al. |
| 5,544,222 A | 8/1996 | Robinson et al. |
| 5,551,066 A | 8/1996 | Stillman et al. |
| 5,561,836 A | 10/1996 | Sowles et al. |
| 5,566,173 A | 10/1996 | Steinbrecher |
| 5,594,718 A | 1/1997 | Weaver, Jr. et al. |
| 5,594,943 A | 1/1997 | Balachandran |
| 5,630,061 A | 5/1997 | Richter et al. |
| 5,636,371 A | 6/1997 | Yu |
| 5,646,939 A | 7/1997 | Lindeborg et al. |
| 5,649,308 A | 7/1997 | Andrews |
| 5,675,490 A | 10/1997 | Bachhuber |
| 5,710,908 A | 1/1998 | Man |
| 5,732,074 A | 3/1998 | Spaur et al. |
| 5,752,193 A | 5/1998 | Scholefield et al. |
| 5,757,916 A | 5/1998 | MacDoran et al. |
| 5,822,427 A | 10/1998 | Braitberg et al. |
| 5,826,188 A | 10/1998 | Tayloe et al. |
| 5,838,251 A | 11/1998 | Brinkmeyer et al. |
| 5,922,073 A | 7/1999 | Shimada |
| 5,941,972 A | 8/1999 | Hoese et al. |
| 6,122,514 A | 9/2000 | Spaur et al. |
| 6,128,509 A | 10/2000 | Veijola et al. |
| 6,175,789 B1 | 1/2001 | Beckert et al. |
| 6,202,008 B1 | 3/2001 | Beckert et al. |
| 6,204,570 B1 | 3/2001 | Muller |
| 6,226,497 B1 | 5/2001 | Guntzer et al. |
| 6,282,469 B1 | 8/2001 | Rogers et al. |
| 6,285,890 B1 | 9/2001 | Panian |
| 6,301,658 B1 | 10/2001 | Koehler |
| 6,341,218 B1 | 1/2002 | Poplawsky et al. |
| 6,377,825 B1 | 4/2002 | Kennedy et al. |
| 6,421,753 B1 | 7/2002 | Hoese et al. |
| 6,425,035 B2 | 7/2002 | Hoese et al. |
| 6,425,036 B2 | 7/2002 | Hoese et al. |
| 6,427,101 B1 | 7/2002 | Diaz et al. |
| 6,429,773 B1 * | 8/2002 | Schuyler ............ B60R 25/04 340/425.5 |
| 6,430,164 B1 | 8/2002 | Jones et al. |
| 6,452,484 B1 | 9/2002 | Drori |
| 6,516,192 B1 | 2/2003 | Spaur et al. |
| 6,535,913 B2 | 3/2003 | Mittal et al. |
| 6,577,934 B2 | 6/2003 | Matsunaga et al. |
| 6,611,740 B2 | 8/2003 | Lowrey et al. |

(56) References Cited

U.S. PATENT DOCUMENTS

| | | | |
|---|---|---|---|
| 6,617,961 B1* | 9/2003 | Janssen | B60R 25/245 307/10.1 |
| 6,629,035 B2 | 9/2003 | Seto et al. | |
| 6,675,081 B2 | 1/2004 | Shuman et al. | |
| 6,704,564 B1* | 3/2004 | Lange | H04L 29/06 340/7.2 |
| 6,738,854 B2 | 5/2004 | Hoese et al. | |
| 6,763,419 B2 | 7/2004 | Hoese et al. | |
| 6,765,497 B2 | 7/2004 | Ablay et al. | |
| 6,789,152 B2 | 9/2004 | Hoese et al. | |
| 6,856,820 B1 | 2/2005 | Kolls | |
| 6,859,718 B2 | 2/2005 | Fritz et al. | |
| 6,868,333 B2 | 3/2005 | Melen | |
| 6,873,824 B2 | 3/2005 | Flick | |
| 6,895,310 B1 | 5/2005 | Kolls | |
| 6,954,689 B2 | 10/2005 | Hanson et al. | |
| 6,957,133 B1 | 10/2005 | Hunt et al. | |
| 6,960,990 B2 | 11/2005 | McKibbon | |
| 6,983,171 B2 | 1/2006 | Van Bosch et al. | |
| 7,003,289 B1 | 2/2006 | Kolls | |
| 7,039,672 B2 | 5/2006 | Wu et al. | |
| 7,051,147 B2 | 5/2006 | Hoese et al. | |
| 7,072,950 B2 | 7/2006 | Toft | |
| 7,092,943 B2* | 8/2006 | Roese | G01S 5/02 |
| 7,142,844 B2 | 11/2006 | Obradovich et al. | |
| 7,197,637 B2 | 3/2007 | Schmidt et al. | |
| 7,346,370 B2 | 3/2008 | Spaur et al. | |
| 7,366,892 B2 | 4/2008 | Spaur et al. | |
| 7,401,352 B2 | 7/2008 | Duri et al. | |
| 7,549,046 B2 | 6/2009 | Fehr et al. | |
| 8,027,293 B2 | 9/2011 | Spaur et al. | |
| 8,327,451 B2 | 12/2012 | Duri et al. | |
| 8,719,592 B2 | 5/2014 | Spaur et al. | |
| 9,130,930 B2* | 9/2015 | Kennedy | B60R 25/04 |
| 9,668,133 B2* | 5/2017 | Kennedy | B60R 25/04 |
| 2001/0039533 A1 | 11/2001 | Pare, Jr. | |
| 2002/0019877 A1 | 2/2002 | Wrede | |
| 2002/0031230 A1* | 3/2002 | Sweet | H04L 63/0428 380/278 |
| 2002/0032853 A1 | 3/2002 | Preston et al. | |
| 2002/0059532 A1* | 5/2002 | Ata | B60R 25/20 726/28 |
| 2002/0097193 A1 | 7/2002 | Powers | |
| 2002/0133716 A1* | 9/2002 | Harif | G07C 9/00103 726/9 |
| 2002/0143447 A1 | 10/2002 | Miller | |
| 2003/0005151 A1 | 1/2003 | Ullman et al. | |
| 2003/0060232 A1 | 3/2003 | Hashimoto et al. | |
| 2003/0158963 A1 | 8/2003 | Sturdy et al. | |
| 2003/0163588 A1 | 8/2003 | Boberg et al. | |
| 2003/0203754 A1* | 10/2003 | Fujimoto | G06Q 20/06 463/25 |
| 2004/0001593 A1 | 1/2004 | Reinold et al. | |
| 2004/0054888 A1 | 3/2004 | Chester | |
| 2004/0054918 A1* | 3/2004 | Duri | G06Q 20/382 726/1 |
| 2004/0070489 A1* | 4/2004 | Ueda | E05B 85/01 340/5.61 |
| 2004/0124968 A1* | 7/2004 | Inada | B60R 25/2081 340/5.72 |
| 2004/0127254 A1 | 7/2004 | Chang | |
| 2004/0204069 A1 | 10/2004 | Cui et al. | |
| 2004/0204192 A1 | 10/2004 | Holloway et al. | |
| 2004/0217852 A1 | 11/2004 | Kolls | |
| 2004/0267410 A1 | 12/2004 | Duri et al. | |
| 2005/0049765 A1 | 3/2005 | Chetia et al. | |
| 2005/0060561 A1 | 3/2005 | Pearson et al. | |
| 2005/0065678 A1 | 3/2005 | Smith et al. | |
| 2005/0075768 A1 | 4/2005 | Nicholson et al. | |
| 2005/0083929 A1 | 4/2005 | Salo et al. | |
| 2005/0102074 A1 | 5/2005 | Kolls | |
| 2005/0131595 A1 | 6/2005 | Luskin et al. | |
| 2005/0171660 A1 | 8/2005 | Woolford et al. | |
| 2005/0197747 A1 | 9/2005 | Rappaport et al. | |
| 2005/0215286 A1 | 9/2005 | Brass et al. | |
| 2005/0266879 A1 | 12/2005 | Spaur et al. | |
| 2006/0235925 A1 | 10/2006 | Rossotto et al. | |
| 2007/0051544 A1 | 3/2007 | Fernandez | |
| 2008/0313282 A1 | 12/2008 | Warila et al. | |
| 2015/0341787 A1 | 11/2015 | Kennedy | |

FOREIGN PATENT DOCUMENTS

| | | |
|---|---|---|
| DE | 4220963 | 1/1993 |
| DE | 4300848 | 8/1993 |
| DE | 3789730 | 9/1994 |
| DE | 19823731 | 12/1999 |
| DE | 10103044 | 7/2002 |
| EP | 0242099 | 10/1987 |
| EP | 0249487 | 12/1987 |
| EP | 0292811 | 11/1988 |
| EP | 0300200 | 1/1989 |
| EP | 0392411 | 10/1990 |
| EP | 0483547 | 5/1992 |
| EP | 0494780 | 7/1992 |
| EP | 0501058 | 9/1992 |
| EP | 0509776 | 10/1992 |
| EP | 0528090 | 2/1993 |
| EP | 0617361 | 9/1994 |
| EP | 0639930 | 2/1995 |
| EP | 0649267 | 4/1995 |
| EP | 0666699 | 8/1995 |
| EP | 0699361 | 3/1996 |
| EP | 0875111 | 11/1998 |
| FR | 2721776 | 12/1995 |
| GB | 2264613 | 9/1993 |
| GB | 2288892 | 11/1995 |
| GB | 2351588 | 1/2001 |
| JP | 60-011755 | 1/1985 |
| JP | 1-503271 | 11/1989 |
| JP | H02-72042 | 6/1990 |
| JP | 3-1621 | 1/1991 |
| JP | 3-196723 | 8/1991 |
| JP | 5-252106 | 9/1993 |
| JP | 07-067174 | 3/1995 |
| JP | 07-177570 | 7/1995 |
| JP | 8-154273 | 6/1996 |
| WO | WO 89/03624 | 4/1989 |
| WO | WO 90/09645 | 8/1990 |
| WO | WO 91/02424 | 2/1991 |
| WO | WO 93/24911 | 12/1993 |
| WO | WO 95/07595 | 3/1995 |
| WO | WO 95/08900 | 3/1995 |
| WO | WO 95/16330 | 6/1995 |
| WO | WO 95/17077 | 6/1995 |
| WO | WO 95/31060 | 11/1995 |
| WO | WO 95/33352 | 12/1995 |
| WO | WO 96/14719 | 5/1996 |
| WO | WO 96/28947 | 9/1996 |
| WO | WO 99/22301 | 5/1999 |
| WO | WO 03/053048 | 6/2003 |

OTHER PUBLICATIONS

"AMI Consortium Formed to Define Common Vehicle Access Standards" NEWS From the Automotive Multimedia Interface Consortium, Dearborn, MI, Oct. 19, 1998, 2 pages.

"Can femotcells boost WiMAX?" available at http://www.wimax-vision.com/newt/1/wimaxvision/viewarticle.html!artid=20017426414, printed May 29, 2007, 2 pages.

"CellPort MSC-9710 MobileWeb Developer's Kit" CellPort Labs, Inc., Copyright 1997, 12 pages.

"FUSION Web Server" PacificSoftworksInc., date unknown, 4 pages.

"History of Communications—INTERNET: Common Standards" available at http://www.fcc.gov/omd/history/internet/common-standards.html, printed Jul. 31, 2006, 1 page.

"History of the Future", available at http://www.isoc.org/internet/history/brief.shtml, printed Jul. 20, 2006, 1 page.

"Motorola Unveils iRADIOtm at CES 2000; Wireless Web Access

(56) References Cited

OTHER PUBLICATIONS

Coming Soon to a Car Near You", NEWS, Las Vegas, NV, Jan. 6, 2000, 2 pages.
"Phoneo" available at http://www.superiorcommunications.com/products/Phoneo.aspx, Superior Communications, printed May 10, 2007, 1 page.
"Powerful New Carmaker Consorium to Create Standard Multimedia Interfaces," The Hansen Report on Automotive Electronics, vol. 11, No. 8, Oct. 1998, pp. 1-8.
"Product review: Networkcar," Telematics Update, Issue 28, Jun.-Jul. 2004, pp. 14-15.
"Sprint Goes Femto With WiMax" available at http://www.unstrung.com/document.asp?doc_id=122376&print=true, Dan Jones, Site Editor for Unstrung, Light Reading Inc., Apr. 23, 2007, 1 page.
"Sprint to Launch Samsung Femtocell", available at http://www.phonescoop.com/news/item.php?n=2146, Source: Samsung, Posted Mar. 28, 2007, 2 pages.
"Startup's dual-radio IC opens door to roaming", Electronic Engineering EETimes, Issue 1323, May 31, 2004, 3 pages.
"Telematics Suppliers Consortium Formed to Define Telematics Standards," Telematics Suppliers Consortium, Detroit, MI, Oct. 19, 1998, 2 pages.
"Windows History Internet Explorer History," available at http://www.microsoft.com/windows/WinHistoryIE.mspx, published Jun. 30, 2003, 1 page.
"Wireless Road by Vetronix," Vertronix Corporation, date unknown, 4 pages.
AB3X Cellular Interface Owner's Manual, Morrison & Dempsey Communications, Nov. 16, 1987.
Amsel: Lange Leitungen—Intelligentes Gateway fur WANs [Long lines—Intelligent gateway for WANs] in: C't Magazin fur Computertechnik, Heise-Verlag, 1992, Issue 07, pp. 86 ff.
Auslander, Edgar; IXI Mobile, Inc.; IXI Mobile Presentation; "Developing the Mobile handset: New Visions," 20 pages.
Bilgic, "A PCS terminal architecture to access multiple networks," Vehicular Technology Conference, 1996. Mobile Technology for the Human Race., IEEE 46th Atlanta, GA, USA, Apr. 28-May 1, 1996, pp. 1160-1164, XP010162572, ISBN: 0-7803-3157-5.
Brauer: Fernbedienug [Remote Control]—Remotely Possible/Sockets 1.0 in: C't Magazin fur Computertechnik, Heise-Verlag, 1995, No. 04, pp. 80 ff.
BREW, Qualcomm, About BREW®, 2 pages at http://brew.qualcomm.com/brew/en/about/about_brew.html (2002-2005).
BREW, Qualcomm, Manufacturer, 2 pages at http://brew.qualcomm.com/brew/en/manufacturer/oem.html (2003).
Clark, "Connected Cars", Extra! A Supplement to Wireless Review, date unknown, 1 page.
Cohen et al., "IP addressing and routing in a local wireless network" One World Through Comminications. Florence, May 4-8, 1992, Proceedings of the conference on Computer Communications (INFOCOM), New York, IEEE, US, vol. 2, Conf. 11, May 4, 1992, pp. 626-632m XP010062192, ISBN: 0-7803-0602-3.
Comer "Internet Protocol: Error and Control Messages (ICMP)" Internetworking with TCP/IP vol. I, Pricipples, Protocols, and Architecture, Prentice-Hall, Inc., Copyright 1995, ISBN 0-13-216987-8, p. 123, 269, cover and inside cover.
Coviello et al., "Conceptual Approaches to Switching in Future Military Networks", pp. 1491-1498, IEEE Transactions on Communications, vol. COM-28, No. 9, Sep. 1980.
Denning et al., "Location-Based Authentication: Grounding Cyberspace for Better Security," Computer Fraud & Security, Feb. 1996, 5 pages.
Duri et al., "Framework for Security and Privacy in Automotive Telematics," Proceedings of the 2nd International Workshop on Mobile Commerce (WMC '02), 2002, pp. 25-32.
Fuchs, Axel, "Next Generation Portable Devices," Telematics Update, Dec. 2003-Jan. 2004, issue 25, pp. 11-13.
Furkukawa et al. "A self-organized reuse-partitioning dynamic channel assignment scheme with quality based power control," Personal, Indoor and Mobile Radio Communications, 1995. PIMRC'95.

Wireless: Merging Onto the Information Superhighway., Sixth IEEE International Symposium on Toronto, Ont., Canada Sep. 27-29, 1995, pp. 562-566, XP010150949, ISBN: 0-7803-3002-1.
Goldberg et al., "Beyond the web: Manipulating the Real World", Computer Networks and ISDN Systems, 1995, pp. 209-219.
Hansen, "Online Onboard: Personal Computing, Speech and the Internet in the Vehicle", Copyright 1998 by Paul Hansen Associates, Rye, New Hampshire, pp. 1-62.
Hosenfeld et al., Kommunikation ohne Grenzen—TCP/IP Informationsubermittlung im Internet [Communication without boundaries—TCP/IP Information transmission in the Internet] in: C't Magazin fur Computertechnik, Heise-Verlag, 1995I, Issue 12, pp. 330 ff.
iPod on Wheels—likelihood: 60 percent and iPhone—Likelihood: 50 percent, Business 20, p. 76 (Apr. 2005).
IXI Mobile, Inc.; IXI Personal Mobile Gateway Brochure; "Connect with Style"; 2001; 11 pages.
IXI Mobile, Inc.; IXI Personal Mobile Gateway Product Information; available at http://www.ixi.com; 13 pages.
Kane, "The HP-IL System" McGraw Hill, 1982, p. 22 and 38.
Katzela et al., "Channel Assignment Schemes for Cellular Mobile Telecommunication Systems: A Comprehensive Survey" IEEE Personal Communications, IEEE Comunications Society, US, vol. 3, No. 3, Jun. 1, 1996, pp. 10-31, XP000593925, ISSN: 1070-9916.
Kelly, S., "Mobile TV coming of age," BBC News, (Jul. 11, 2004), 3 pages available at http://news.bbc.co.uk/go/pr/fr/-/2/hi/technology/3880069.stm.
Kunze: Geheimtip—Entwickeln und Testen von Web-Projekten [Insider's tip—Developing and testing web projects] in: C't Magazin fur Computertechnik, Heise-Verlag, 1995, Issue 07, pp. 166 ff.
Leibson "The Handbook of Microcomputer Interfacing" Tab Books, Inc., 1983, p. 135 and 141.
Margolin "Smarter Stuff" Byte, Jun. 1997, 5 pages.
Momal et al., "Using World-Wide_Web for control systems" Proceedings of the 1995 International Conference on Accelerator and Large Experimental Physics Control Systems, Chicago, Illinois, Oct. 30-Nov. 2, 1995, pp. 62-67.
Motsay, "Telematics could get boost from 802.11p development" RCR Wireless News, Aug. 9, 2004, 1 page.
Napolitano et al. "UMTS all-IP Mobility Management, Call and session control Procedure"; Mar. 24, 2000; XP002149519.
Pascoe, R., IEEE Spectrum Online, "Building Networks on the Fly" 5 pages, (Feb. 28, 2001) available at http:/www.spectrum.ieee.org/WEBONLY/publicfeature/mar01/net.html, printed Jan. 19, 2005.
Pascoe, R., The Salutation Consortium, "Geographic Computing: Enabling New Markets for Hand Held and Palm-Size Information Appliances: A Salutation White Paper," 14 pages, (Dec. 16, 1998).
Perkins "Mobile IP" IEEE Communications Magazine, May 1997, 12 pages.
Qualcomm, Wireless Business Solutions, "Presentation to the IWPC Workshop," date unknown.
Richard, III, G.G., IEEE Internet Computing, "Service Advertisement and Discovery: Enabling Universal Device Cooperation," pp. 18-26 (Sep.-Oct. 2000).
Stuckenberg: Labyrinth—Routing-Verfahren in Wide-Area Networks [Routing methods in wide area networks] in: C't Magazin fur Computertechnik, Heise-Verlag, 1994, No. 11, p. 238 ff.
Swasey "Padcom Intros Data Technology Laptop Users Can Receive Data Over Different Networks", date unknown, 1 page.
Talbot "Soul of a New Mobile Machine" Technology Review, May/Jun. 2007, p. 46-53 and cover.
Taylor et al. "Telerobot on the World-Wide-Web", Proceedings of Robots for Australian Industries conference, Australian Robot Association, Melbourne, pp. 108-120.
Toshiba announces Ubiquitous Viewer software, MobileTracker, 1 page at http://www.mobiletracker.net/archives/2005/01/18/toshiba-pc-control, (2003-2005).
van den Broek, J., "Pushlets—Whitepaper," Just Objects B.V., 16 pages at http://www.pushlets.com/doc/whitepaper-all.html, (2002).
van den Broecke, J., "Pushlets: Send events from servlets to DHTML client browsers," JavaWorld, 15 pages at http://www.javaworld.com/javaworld/jw-03-pushlet_p.html, (Mar. 2000).

(56) References Cited

OTHER PUBLICATIONS

Varrall, "The Impact of the Internet on Wireless Networks", Shosteck Cellular//PCS Strategies newsletter, date unknown, 3 pages.
Wildstrom, S.H., "Coming Soon: Mobile Couch Potatoes," Business Week, p. 22 (Mar. 28, 2005).
Wright et al., TCP/IP Illustrated vol. 2: The Implementation, Addison-Wesley Professional Computing Series, Mar. 1996, pp. 63-74.
Zeman, "Ubi, I Be, We Be Screaming for Samsung's UbiCell Femtocell", available at http://www.informationweek.com/blog/main/archives/2007/03/ubi_ibe_webe_sc.html.jses . . . , Mar. 30, 2007, 2 pages.
International Search Report of International (PCT) Patent Application No. PCT/US04/02441, dated May 31, 2005.
Written Opinion of International (PCT) Patent Application No. PCT/US04/02441, dated May 31, 2005.
International Preliminary Report on Patentability of International (PCT) Patent Application No. PCT/US04/02441, dated Aug. 8, 2005.
Supplementary European Search Report for European Patent Application No. EP04706066, dated Sep. 5, 2007, p. 1-4.
First Office Action issued by European Patent Office, dated Sep. 9, 2008, pp. 1-8, Application No. 04706066.0-02421, European Patent Office, Munich, Germany.
Summons to Attend Oral Proceedigns for European Patent Application No. 04706066.0, includig objections and preliminary evaluation fo subject matter, dated Mar. 16, 2010, 6 pages.
Brief Communication regarding Oral Proceedings, European Application No. 04706066.0, dated Jun. 30, 2010,1 page.
Communication under Rule 71 (3) EPC, European Application No. 04706066.0, dated Jul. 8, 2010, 4 pages.
Office Action for Japanese Patent Application No. 2006-503122 (with translation), dated Feb. 16, 2010, 8pages.
Whitfield, International Search Report for International (PCT) Patent Application No. PCT/US05/14989, dated Aug. 24, 2007, p. 1-5.
Whitfield, Written Opinion for International (PCT) Patent Application No. PCT/US05/14989, dated Aug. 24, 2007, p. 1-5.
Nickitas-Etienne et al., International Preliminary Report on Patentability for International (PCT) Patent Application No. PCT/US05/14989, report dated Sep. 18, 2007, p. 1-9.
Supplementary European Search Report for European Patent Application No. EP05759479, dated Jan. 30, 2008, p. 1-6.
Examination Report for European Patent Application No. 05759479.8, dated Sep. 21, 2009, 3 pages.
First Office Action issued by European Patent Office for European Patent Application No. 05 759 479.8-1244, dated Oct. 21, 2008, p. 1-8.
Extended European Search Report for European Patent Application No. 10182443.1, dated Mar. 26, 2012, 10 pages.
Official Action for U.S. Appl. No. 10/767,548, dated Jul. 6, 2007, p. 1-6.
Notice of Allowance for U.S. Appl. No. 10/767,548, dated Oct. 23, 2007, p. 1-4.
Notice of Allowability for U.S. Appl. No. 10/767,548, dated Jan. 29, 2008, p. 1-3.
Official Action for U.S. Appl. No. 12/017,467, dated Oct. 7, 2009.
Official Action for U.S. Appl. No. 12/017,467, dated Dec. 9, 2010.
Official Action for U.S. Appl. No. 12/017,467, dated Apr. 11, 2012.
Official Action for U.S. Appl. No. 12/017,467, dated Oct. 5, 2011.
Official Aciton for U.S. Appl. No. 12/017,467, dated Jun. 15, 2011.
Notice of Allowance for U.S. Appl. No. 12/017,567, dated Jul. 1, 2013, 6 pages.
Official Action for U.S. Appl. No. 14/042,246, dated Aug. 1, 2014, 18 pages.
Final Action for U.S. Appl. No. 14/042,246, dated Feb. 6, 2015, 18 pages.
Notice of Allowance for U.S. Appl. No. 14/042,246, dated May 5, 2015, 18 pages.
Official Action for U.S. Appl. No. 14/819,141, dated May 5, 2016, 18 pages.
Final Action for U.S. Appl. No. 14/819,141, dated Jan. 6, 2017, 7 pages.
Notice of Allowance for U.S. Appl. No. 14/819,141, dated Apr. 12, 2017, 5 pages.
Official Action for U.S. Appl. No. 10/836,939, dated Jun. 8, 2007.
Notice of Allowance for U.S. Appl. No. 10/836,939, dated Oct. 23, 2007, p. 1-9.
Supplemental Notice of Allowability for U.S. Appl. No. 10/836,939, dated Nov. 20, 2007, p. 1-20.
Official Action for U.S. Appl. No. 11/119,266, dated Oct. 5, 2006.
Official Action for U.S. Appl. No. 11/119,266, dated Sep. 26, 2007, p. 1-8.
Notice of Allowance for U.S. Appl. No. 11/119,266, dated Apr. 10, 2007.
Official Action for U.S. Appl. No. 11/119,266, dated Jun. 27, 2008.
Office Action in U.S. Appl. No. 11/119,266, dated Feb. 20, 2009, pp. 1-16.
Official Action for U.S. Appl. No. 11/119,266, dated Aug. 24, 2009, 15 pages.

* cited by examiner

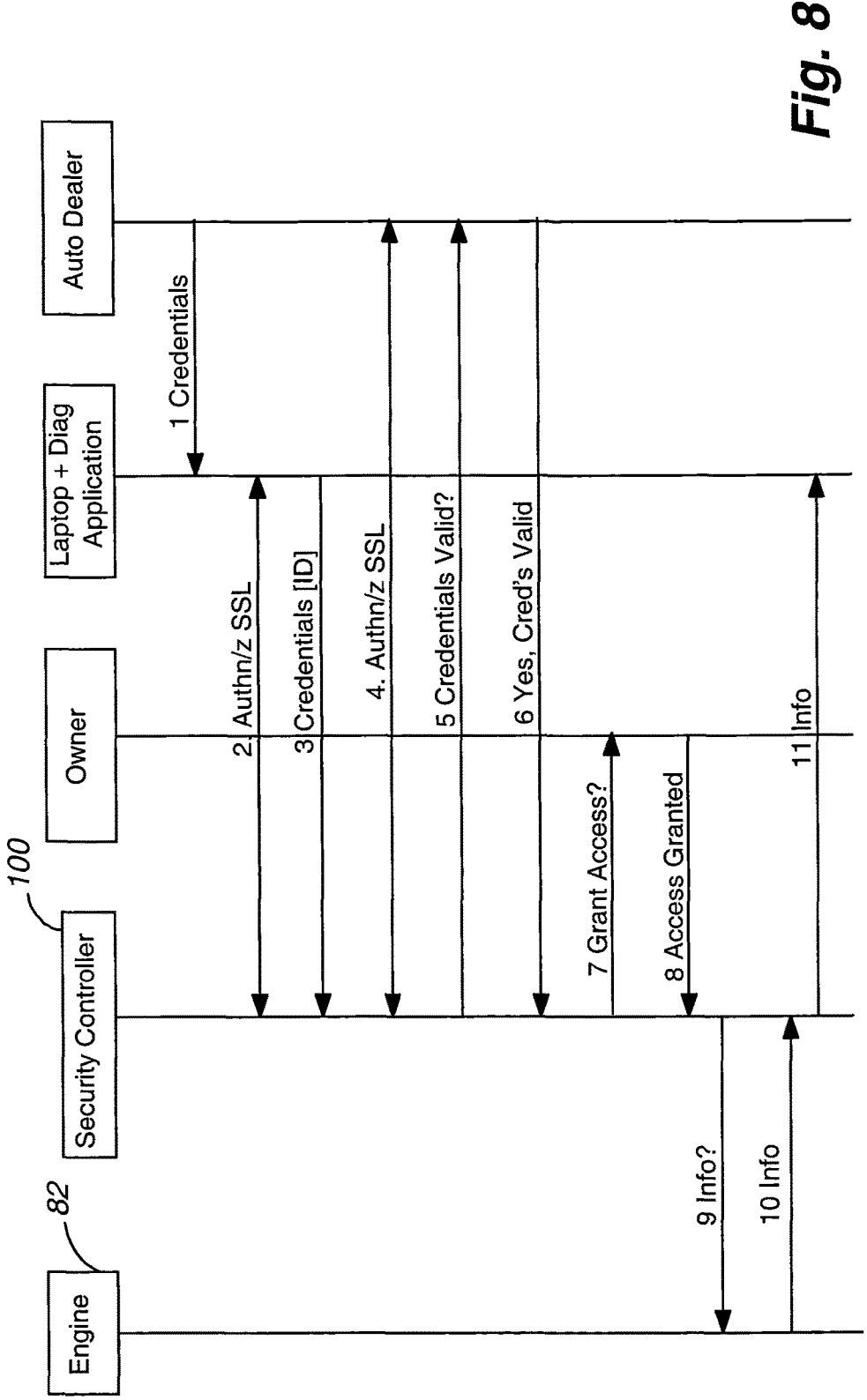

SECURE TELEMATICS

CROSS REFERENCE TO RELATED APPLICATIONS

This application is continuation of U.S. patent application Ser. No. 14/819,141, filed Aug. 5, 2015, which is a continuation of U.S. patent application Ser. No. 14/042,246, filed Sep. 30, 2013, now U.S. Pat. No. 9,130,930, which is a continuation of U.S. patent application Ser. No. 12/017,467, filed Jan. 22, 2008, now U.S. Pat. No. 8,719,592, which is a continuation of U.S. patent application Ser. No. 10/767,548, filed Jan. 28, 2004, now U.S. Pat. No. 7,366,892, which claims the benefit of U.S. Provisional Application Ser. No. 60/443,505, filed Jan. 28, 2003, the entire disclosures of which are hereby incorporated herein by reference.

FIELD

The present invention relates to telematics and in particular to securing communications involving uses of proprietary resources in a vehicle.

BACKGROUND

Technologies have been devised or advanced that contribute to expanding the use of commercial and personal vehicles from merely a form of transportation to acting as communication hubs. The vehicle is able to communicate wirelessly with remote systems in order to serve or facilitate a number of objectives including related to safety, navigation, information gathering, entertainment and education. Communications in and with the vehicle typically involve a cellular phone or other communication source/device that is able to send and receive communications from outside the vehicle.

Although significant efforts have been directed to improving vehicle communications, substantial barriers remain to fulfill the vast potential of the telematics field. Vehicle communications can require a number of systems and devices that can include hardware and/or software resident in the vehicle. These can be proprietary to certain entities, such as owners or lessees. There is great reluctance on the part of vehicle makers and others to allowing use of proprietary systems by third parties. In the context of the car manufacturer, it may have numerous proprietary rights in vehicle interfaces, storage memories, vehicle buses, and vehicle devices. There are concerns with the safety and integrity of such systems if third parties were allowed unauthorized or uncontrolled access. There must also be sufficient economic and financial reasons to permit access and use by third parties. Consequently, it is important not only to provide a physical infrastructure that facilitates communications involving the vehicle, but also economic incentives and acceptable returns on investment.

Unleashing the potential of telematics requires cooperation among various entities, including car makers, manufacturers of communication devices including cellular telephones, developers of applications and communication service providers. One or more of these entities has proprietary technologies or interests that must be taken into account and safeguarded. For example, handset manufacturers interface to the handset and vehicle manufacturers interface to vehicle devices. Until there are compelling applications that make use of proprietary vehicle systems and technologies in place to protect proprietary rights, telematics development will be inhibited. Furthermore, vehicles themselves are complex systems where reliability is critical for human safety. Any modifications to the tested and deployed vehicle systems introduces new risk. On the other hand, if proprietary systems can be rendered secure and shared by the various entities, the issue of security is no longer a draw-back and overall costs associated with vehicle communications can be reduced. Additionally, a rich set of applications can be developed once acceptable access to proprietary systems in the vehicle are made available.

It would be advantageous therefore to provide a framework for protecting the proprietary systems and the interests of multiple parties, including the end user, who are involved with numerous and diverse vehicle communications. The interests of the end user can include in at least certain applications protection of the user's privacy. Privacy of the end user might be safeguarded when utilizing resources in the vehicle to conduct financial transactions. In addition to appropriate security and/or privacy protection, it would also be appropriate to establish relationships among the various parties that provide incentive for providing open access to resources associated with vehicles including acceptable remuneration.

SUMMARY

In accordance with the present invention, system and method are provided for utilizing resources, including proprietary resources in a vehicle. Such utilization requires establishing relationships between and/or among entities having interests, proprietary and otherwise, in resources that are found in the vehicle or can be located in the vehicle. Establishment of relationships includes defining compensation provisions between or among various entities, together with approving resources to be used with proprietary and/or non-proprietary resources found in the vehicle and ensuring that only approved resources are used.

The proprietary resources can include one or more of the following: vehicle buses, vehicle devices, interfaces, subsystems, storage memory in the vehicle, applications executed in the vehicle, connectivity hardware/software and communication devices. Digital buses in the vehicle might include: MOST, IDB 1394, TTP, CAN, FlexRay, LIN, SAE J1939, SAE J1708/1587, SAE J1850, ISO9141, as well as a common bus to which numerous proprietary and non-proprietary resources communicate. The common bus can be based on one or more of the above-noted bus technologies. The common bus could also be implemented using wireless technologies. Proprietary subsystems and/or vehicle devices might include various electronic control units (ECUs) a navigational global positioning system (GPS), an inflator subsystem or device, a personal digital assistant (PDA), a laptop computer, a vehicle monitoring system (VMS) and an accident and emergency notification alarm (AENA). Interfaces might include numerous and diverse application programming interfaces (APIs). Communication subsystems might include portable or cellular telephones and subsystems that communicate with wireless technology networks using licensed and unlicensed communication channels. Proprietary and/or non-proprietary applications might include applications related to entertainment delivered to the vehicle, data gathering from the vehicle, educational information supplied to the vehicle, information sent to the vehicle for use by one or more subsystems and/or vehicle devices in the vehicle. Such applications can be in a variety of fields or areas including related to security services, multi-user services, vehicle-to-vehicle communication services, geographical services, regulatory services, communication services and commerce services.

The entities with whom relationships can be built based on mutually acceptable conditions include the vehicle makers as the primary entity and other entities including application developers/providers, governmental entities, communication, financial, business and consumer service providers, providers of products and proprietary subsystems and/or device suppliers, as well as vehicle owners/users. The conditions under which two or more of these entities are to cooperate can be based on one or more fixed payments, use payments to be made by at least one entity to at least another entity, geographic requirements, resource usage limitations, and remedies for non-compliance. A key factor related to establishing the necessary relationships includes certifying resources for use with each other, while taking into account the safety of those involved with such resources and the security of the resources. At least some of the entities can be members of a federation that is implemented by a federated security architecture in which member entities accept security requirements and protocols as part of interacting with each other.

The resources of the system include one or more communication subsystems that enable wireless communications relative to the vehicle. These communication subsystems might include cellular telephones together with their associated interfaces, and other apparatuses for enabling communications with one or more appropriate wireless technologies, such as a wireless LAN (Local Area Network). The system can also include a vehicle gateway that allows access to information obtained from vehicle devices that are connected to vehicle buses. In a preferred embodiment, the vehicle gateway communicates with the common bus to which a number of proprietary and/or non-proprietary resources can also communicate.

The system also includes a security controller that is connected to the common bus. The security controller can act as a hub through which all information passes in connection with achieving desired security, especially controlling usage of resources by more than one entity. The security controller is involved with security authentication of entities and/or resources, facilitates secure channel establishment between or among entities and/or resources and provides bus and bandwidth arbitration services. The security controller essentially acts as a switch in the system and can act as a proxy for other resources or services. All traffic between or among entities and/or resources is routed by or initiation is mediated by the security controller. After a secure session has been established, the security controller need only be involved as necessary to monitor traffic. Monitoring can relate to verifying that the traffic conforms to the predetermined profile, for example, of one or more particular applications. In one embodiment, the security controller is not integrated into the common bus as a hub or switch, but communicates with the common bus and monitors activities related to security in order to effect its control in connection with assuring that conditions associated with the established relationships are met.

In a preferred embodiment, the system further includes a number of interface modules for which the security controller could provide authentication services. These can be identified as a communication services module, a human/machine interface services module and vehicle services module. The communication services module protects and arbitrates access to resources related to communication. The human interface services module arbitrates access to resources related to display and operator intervention or involvement. The vehicle services module controls access to vehicle gateway services including assistance related to accessing information obtained from vehicle devices that are connected to one or more vehicle buses. In one embodiment, these interface modules may be incorporated in the security controller.

With regard to steps, operations and/or procedures implementing or involving the system, entities accept conditions that establish their relationships. The conditions can be the same for three or more entities or they can be different. For example, establishing relationships might involve a vehicle maker and an application owner or another having a proprietary interest in an application that is used or is executable with a proprietary vehicle device. Another relationship might be established between this same car maker and a proprietary subsystems supplier, such as an after market vehicle device or an add-on vehicle device. The conditions accepted by the car maker and subsystem supplier may be different from those that establish the relationship between the car maker and the application developer or other application providing entity. Relatedly, such an application entity might establish a relationship with the subsystem supplier that includes conditions that are the same or different from those that establish the relationship between the car maker and the subsystem supplier. These conditions can relate to compensation and resource usage.

The establishment of relationships can also involve empowering a certificate authority, who can issue assertions, credentials or certificates that are to be used by the system. The certificate authority is fundamentally responsible for issuing certificates in a secure manner to approved resources for use in the vehicle. Such resources may be proprietary or non-proprietary. These resources can include applications that utilize other resources. A certificate authority can be one of the entities that is included in the group that establishes relationships, such as a vehicle maker, or the certificate authority could be an independent third party. There can be more than one certificate authority and a certificate authority could reside with the vehicle that issues credentials to resources within the vehicular security domain. The security controller itself could act as a certificate authority and issue certificates to vehicle subsystems or other vehicle resources. In addition to issuing certificates for approved applications and/or subsystems, the certificate authority could also be involved with certifying one or more entities themselves.

In one embodiment, the certification process has the certificate authority being initialized with one or more signature keys associated with supporting desired security. The certificate authority could create a public key and a private key pair. The public key is delivered to the security controller and can be used to verify or authenticate one or more certificate signatures that are submitted to it. The certificate authority could also issue keys to an application developer that allows one or more applications to make certificate requests. For example, the certificate authority could create at least a certificate request private key that it sends to the application developer. The application developer uses that private key to generate an application certificate request that is sent to the certificate authority. The certificate authority determines whether or not to grant the certificate request. In connection with that determination, certain procedures can be implemented. These procedures can be implemented by the certificate authority or, alternatively, another entity such as an application verification authority. Such an authority can perform steps related to auditing the application developer's security practices and testing the application in a number of system environments for behavioral and safety considerations. When there is approval, the certificate authority can issue the certificate. The certificate can include certain properties and/or rights, such as: a unique identifier for the certificate owner, a priority level assigned to the application, duration of the certificate, geographic or other location where the certificate is deemed valid, the identification or description of other resources and/or entities with which the application must communicate to function properly, and APIs that the application is allowed to use.

The certification process may also be associated with other aspects of the relationships that have been established, such as being correlated with compensation affinity credits or royalties that might be paid as part of one or more conditions accepted by the involved entities. A certificate may also be revoked for an application that has been compromised. The security controller is provided with revocation information so that during its authentication process it can determine whether or not the certificate for a particular application has been revoked.

After the certificate is granted for an application, access and use according to the contents of the certificate are allowed. As part of its functions, the security controller can monitor the access sought by such an application. After authorization by the security controller, the application can work with one or more resources in the vehicle based on the properties and/or rights set out in the certificate. As previously noted, the application can take many forms in numerous and diverse fields for a large number of uses or functions.

Based on the foregoing summary, a number of advantages of the present invention are readily understood. The present invention expands telematics usage in a vehicle by providing architecture and methodology so that desired incentives and security are met. Development of numerous and diverse applications for vehicle communications are encouraged and supported. Vehicle resource usage can be enhanced by the framework of the present invention. Passenger safety and convenience are fostered by facilitating more and different ways to communicate with the vehicle and its passengers. Sharing of resources should lead to more services for the vehicle user and concomitant reductions in cost. More specifically, the present invention protects the integrity of vehicle resources. Privacy of user and vehicle information is benefitted. Telematics applications are able to more safely access and utilize resources in the vehicle. Standards and procedures are provided related to achieving desired security at the application level. Selective and secure enabling of functions associated with the vehicle is advanced. Opportunities are promoted for additional revenue streams, such as pay for use applications and subscriptions. Secure remote diagnostic capabilities and secure upgrades of vehicle software are included. New business or market models are facilitated including mobile advertising and customer affinity programs. Multiple vehicle buses can be rendered more robust and adaptable in communicating with other vehicle resources. The intelligent and secure selection of communication paths are also provided. Security measures can be implemented using a federated security framework that protects user privacy when accessing resources involved with providing of services and/or products for consumers and/or businesses.

Additional advantages of the present invention will become readily apparent from the following discussion, particularly when taken together with the accompanying drawings.

BRIEF DESCRIPTION OF THE DRAWINGS

FIG. 8 is a diagram that illustrates steps and communications for securely allowing access to a vehicle bus by a consumer device in a federated security framework.

DETAILED DESCRIPTION

Figure 1:
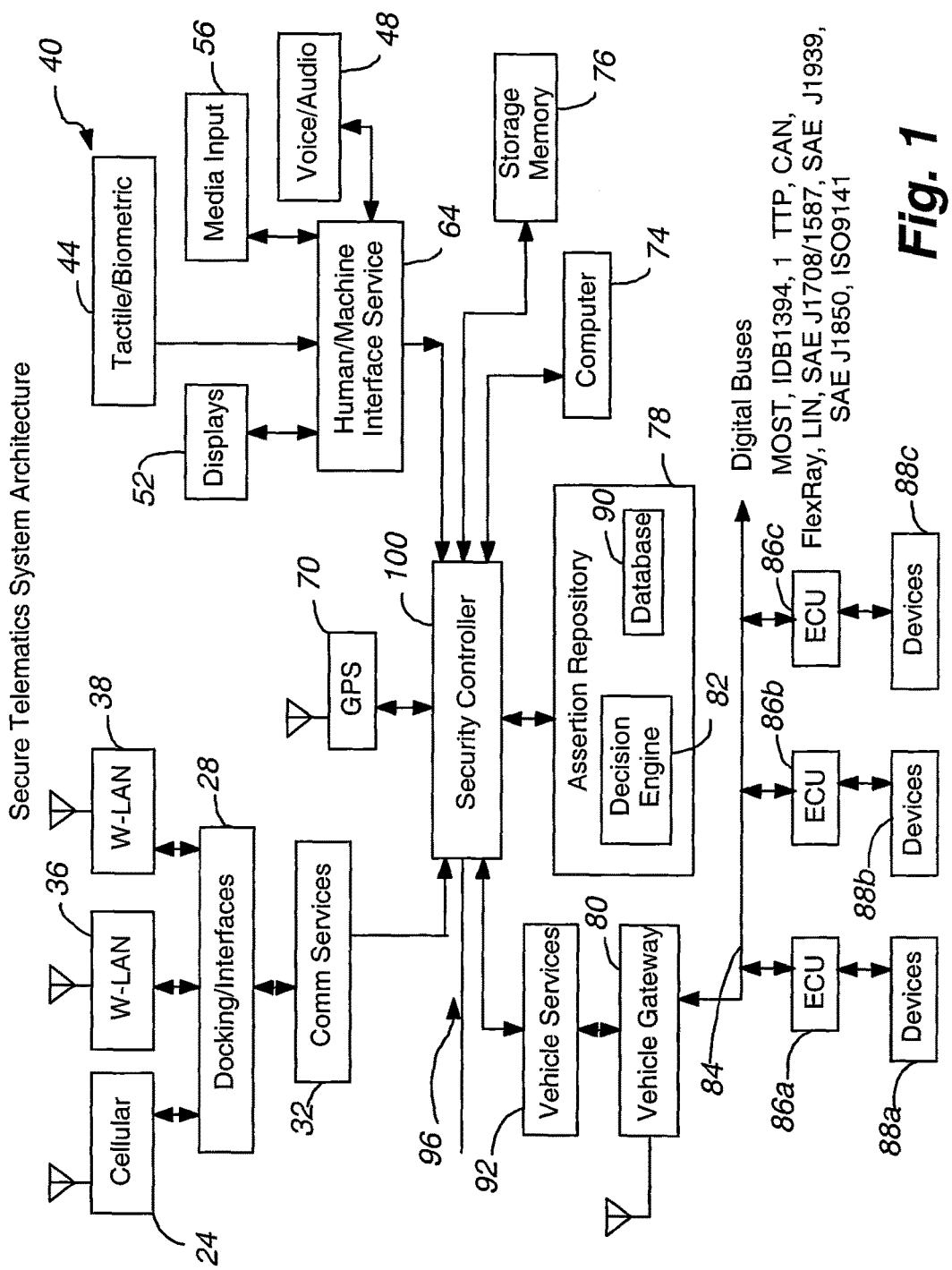
FIG. 1 is a block diagram of an embodiment of the system of the present invention in which the security controller acts as a central hub or switch.

Referring to FIG. 1, a telematics secure system 20 is illustrated that can be located with a vehicle. The system 20 includes apparatuses or subsystems for providing communications to and from the vehicle. Although one or more of a number of apparatuses could be employed including an embedded cellular transceiver and later developed apparatuses, certain apparatuses are noted. A cellular phone 24 can be held in the vehicle for transmitting/receiving digital and/or analog information, such as voice and digital commands and digital data. The cellular phone 24 permits wireless communications outside the vehicle including to/from remote sources that wish to communicate with vehicle resources. The cellular phone 24 can be physically held and electronically adapted to vehicle communication paths using a docking/interfaces subsystem 28. This subsystem 28 facilitates communications for the vehicle user (driver and/or passenger), particularly where the cellular phone 24 is being operated in a hands-free mode. Like the cellular phone 24 that can be selected from various makes and models of cellular telephones, the docking/interfaces subsystem 28 can be one or more different apparatuses that are compatible with the particular cellular phone 24 that is selected and utilized. Implementations of certain docking/interfaces subsystems are disclosed in patents assigned to the same assignee as the owner of the present application including U.S. Pat. No. 5,333,177 issued Jul. 26, 1994; U.S. Pat. No. 5,535,274 issued Jul. 9, 1996; U.S. Pat. No. 6,377,825 issued Apr. 23, 2002; and U.S. Pat. No. 6,341,218 issued Jan. 22, 2002.

In one embodiment, the docking/interfaces subsystem 28 communicates or is associated with a communication services module 32. The module 32 can be software comprised of executable program code that protects and arbitrates access to communication resources in or involved with the vehicle. Fundamental functions that can be associated with the communications services module 32 include: supporting communication paths to the Internet for other resources associated with the vehicle; contributing to secure communications on one or more buses found in the vehicle; outputting fault notifications; monitoring and logging usage of communications-related resources; enforcing usage rules for communication resources and managing tools involved with security control, including authentication and authorization related to usage of links and/or resources associated with the vehicle. The communications services module 32 could also be used to support automatic or intelligent selection of communication links, as described in U.S. Pat. No. 6,122,514 issued Sep. 19, 2000 and which is also assigned to the assignee of the present application. Other wireless communication subsystems that can be included with the vehicle include a wireless LAN 36 and a wireless PAN 38. Like the cellular phone 24, the wireless LAN 36 and wireless PAN 38 subsystems can communicate with a compatible interface (e.g. docking/interfaces 28) for providing transmissions to the vehicle and sending transmissions from the vehicle, which are properly arbitrated and protected using the communication services module 32.

In addition to communication resources, the system 20 can include human interface 40 to permit operator or human interaction or control and can also provide information to the vehicle user by means of visual displays and/or audio outputs. The human interface 40 may have a number of input/output mechanisms or devices. These can include a tactile and/or biometric input subsystem(s) 44 that are implemented using appropriate technologies for receiving certain sensory inputs, such as those produced by touch or contact. The tactile devices can include programmable input elements, such as buttons, switches, touch points/screens, that enable the user to input desired control information or to modify existing settings. Inputs related to visual or scanned information can also be supplied using one or more of these subsystems 44. One or more voice/audio inputs or subsystems 48 can also be part of the human interface 40. These subsystems or technologies enable voice inputs to be received for desired control/command objectives useful in initiating or otherwise controlling voice recognition functions. The audio outputs from such subsystem(s) 48 can be provided for any number of purposes, including entertainment, education, pre-recorded voice prompts, and other information desirable objectives, including providing responses and directions (text-to-speech outputs) based on voice inputs. One or more displays 52 can be part of the human interface 40. The display or one of the displays 52 can be for navigation purposes to present location-related information. The display or displays 52 can also be used to depict requested vehicle device information. The media input 56 can include one or more subsystems that enable desired media to be seen and/or heard within the vehicle, such as a hard disk as a storage medium, DVD and CD-ROM machines and a map database. Generally, the human interface 40 is part of the vehicle and has one or more components and/or subsystems that are proprietary to the vehicle maker.

Like the communication resources, the human interface 40 has a human/machine interface services module 64 that is similar in many respects to the communication services module 32. The human/machine interface services module 64 functions to support secure communications on one or more of the vehicle buses, provides fault notification related to the human interface 40, can monitor and log resource usage associated with operator subsystems and components, polices usage rules associated with the human interface 40 and can also be involved with overseeing and managing tools involved with verifying proper usage of component/subsystems of the human interface 40.

A number of other subsystems can also be incorporated, either permanently or removably, as part of the telematics secure system 20. The subsystems can be provided as part of the original vehicle equipment or included later as vehicle add-ons. They can be proprietary or non-proprietary resources. Proprietary interest(s) in such subsystems can reside in the vehicle makers themselves or in other parties having authorized access to the vehicle. The subsystems can include a global positioning system (GPS) 70 that provides geographic or locational information associated with the vehicle, one or more computers 74, and storage memory 76. The computer or computers 74 can be portable and removable from the vehicle or embedded with the vehicle for use by vehicle passengers. The computer(s) 74 can include a personal digital assistant (PDA) a laptop or any other intelligent and/or processing unit. The computer(s) 74 can be used to send and receive communications relative to the other resources of the system 20, as well as communications externally of the vehicle. The storage memory 76 can contain proprietary data and/or program code that involves use of other resources located within and/or outside of the vehicle. The storage memory 76 can also encompass one or more hard disks and/or removable memory, such as CD-ROMs.

The subsystems can also include an assertion repository 78 which functions to store and retrieve signed or unsigned information that may be generated by devices 88 within the vehicle or may be generated by entities involved with or supporting security measures within the vehicle or any other authorized third party. Such information can comprise assertions that include information or statements related to characteristics associated with an entity involved with the communication, transaction and/or other activity being conducted, or sought to be conducted, using one or more vehicle resources. The content of the assertion can be varied in other ways to provide enough information to grant desired access and/or use, while preserving privacy of one or more users or involved parties. Relatedly, based on the content of a particular assertion, rights, obligations and/or abilities associated with the communication, transaction and/or other can be defined or described.

The assertion repository 78 may include a policy decision engine 82 and a database 90. The policy decision engine 82 is responsible for deciding which information of a plurality of stored information is to be released to a particular request. The factors that might be relied upon by the decision engine 82 in making its determinations can include the identity of the requester, the information being requested and the existence of an appropriate user's consent. One or more decisions may also be based on information or results from communications with third parties. Third parties may also be utilized to obtain additional information for release. The decision engine 82 can also be configured to handle requests to store additional information in the database 90 and make decisions on whether or not to accept such additional information. The signed or unsigned information can be applicable to granting or denying authorization to use a particular service or product provider, i.e. target provider. The database 90 can store any number of signed or unsigned assertions related to allowing access in connection with obtaining a particular service or product, or information. These assertions are available for request by the policy decision engine 82, and the database 90 is configured to release this information only to or with the authorization of the decision engine 82. The database can be implemented using any number of data storage techniques such as relational and/or object databases and including LDAP, XML, and SQL. Appropriate applications for the assertion repository 78 will be described later herein in the context of discussions about uses of the secure telematics system 20.

Additional resources found in the vehicle can include a vehicle gateway 80. The vehicle gateway 80 conventionally communicates with one or more vehicle buses 84 to which one or more vehicle devices 88 are connected or communicate with using electronic control units (ECUs) 86. Each ECU 86 interfaces one or more of the digital buses 84 with a particular vehicle device 88 and each such ECU can be individually designated as 86a, 86b, 86c . . . . The ECU 86 can include one more of a number of different control subsystems such as a body control, a chassis control, an engine control, a transmission control and a telematics control. The body control typically controls all interior equipment such as seats, HVAC, instrument cluster, power windows, power doors and other vehicle devices. The vehicle devices 88 can be separately identified as 88a, 88b, 88c . . . . The vehicle buses 84 can be one or more digital buses and can include known buses identified as MOST, IDB 1394, TTP, CAN, FlexRay, LIN, SAE J1708/1587, SAE J1939, SAE J1850, ISO9141. The vehicle devices 88 can include an engine monitor, an engine temperature sensor, a pressure sensor, an inflator system for activating air bags and/or vehicular tension-producing devices (e.g., for tensioning seat belts). The vehicle gateway 80 controls access to and use of the vehicle buses 84. Relatedly, by means of the vehicle gateway 80, commands can be sent on one or more buses 84 to one or more selected devices 88 that are connected to the particular bus or buses 84. The vehicle gateway 80 can also have wireless communication interfaces, as well as directly receive remote wireless input(s) by means of an antenna or the like. Such input(s) could be used to supply control signals to vehicle devices 88 including those used in supporting the locking/unlocking of vehicle doors and remote vehicle engine starting.

In communication with the vehicle gateway 80 is a vehicle services module 92. Similar to the communication services module 32 and the human/machine interface services module 64, communications relative to the vehicle gateway 80 pass through the vehicle services module 92 in order to control access to vehicle gateway controlled vehicle buses 84 and vehicle devices 88. The functions of the vehicle services module 92 include supporting secure communications on one or more vehicle or telematics buses 84, contributing to the enablement of intra-vehicle wireless communications (e.g. PAN, such as Bluetooth), arbitrating vehicle bus access for outgoing requests, providing fault notification related to vehicle gateway operations, monitoring and logging usage of the vehicle gateway 80, vehicle buses 84 and/or vehicle devices 88, enforcing rules related to uses of such resources that communicate with the vehicle gateway 80, and managing tools related to providing security, such as access keys and certificates approving access.

With regard to enabling communications in a secure manner, the system 20 preferably includes a common bus 96 with which a number of, if not all, communicable resources in the vehicle communicate. In this embodiment, the common bus 96 can link these resources to a security controller 100, which acts as a hub or switch through which communications pass relative to the communicable resources. Although represented in FIG. 1 as separate lines or connections to the security controller 100, it should be appreciated that all such lines when linked together represent a common bus. The common bus 96 can be based on one of a number of available bus technologies including those that provide or implement the vehicle or digital buses 84. The common bus 96 could also be implemented using wireless technologies.

The common bus 96 can be defined to include a physical layer and a logical layer. The physical communication layer of the common bus 96 connects the different resources of the system 20 together. Vehicle manufacturers would typically control the characteristics of such buses. The common bus 96 should have at least the following capabilities: sufficient bandwidth to support applications, an open architecture, standardized features, be widely supported, be multiported and have peer-to-peer functionality available. The logical layer provides the manner by which resources on the common bus 96 communicate with each other. The logical layer is configured so that different resources from different manufacturers can be properly linked to and communicate with the bus. The logical layer can be comprised of several different protocols to enable communication between or among devices, services and application program interfaces (APIs) that facilitate requests for certain services. Services may define their own APIs for communication with other devices. APIs that may be defined include: the security controller 100 to establish secure connections between resources or between a resource and a hub; a communication services API enabling Internet and wireless communications for resources on the common bus 96; a vehicle gateway services API enabling status retrieval and control services for the vehicle; an API for the GPS 70 to enable transmissions of position information; a display API for displaying information using the operator unit 40; registration related APIs to register resource capabilities; and broadcast related APIs for general dispersal of information. Some APIs are already available, for example, AMI-C (Automotive Multi-Media Interface Collaboration) has a defined set of protocols for communication with the vehicle gateway 80. Security protocols associated with the system 20 are to be compatible with AMI-C, as well as other existing protocols.

The successful growth of telematics requires safeguards against unauthorized requests to vehicle resources so as not to allow adverse impacts on vehicle operations. Vehicle communications may be classified from those that entail essentially no risk to those having high risks, with different risk levels in between, such as low risk and medium risk. The degree of risk can be based on a number of factors including sensitivity of information, privacy of information, and extent of detrimental effects that can occur when there is an unauthorized communication. A risk can be assessed based on key factors that include the resource or resources involved with the sending function and the resource or resources involved with the receiving function. A key risk factor relates to the particular application involved with a transmission. Applications can include changing configurations of vehicle devices or equipment; displaying vehicle status, upgrading firmware in the vehicle, conducting vehicle diagnostics, downloading one or more applications, downloading media information, downloading advertising, obtaining position information and updating or checking security assertions.

In one embodiment, the security controller 100 can include one or more secure processors and a GPS receiver that is embedded or integral with the secure processor. This combination can effect appropriate secure operations, especially when it is desired to accurately associate GPS information with one or more particular security controller operations. Preferably, the security controller 100 is configured in the system 20 as a central hub or switch through which all traffic involving resources passes. After a secure session has been established, the security controller 100 need only be involved as necessary to monitor data or other information including one or more applications. The security controller 100 can be implemented as a single chip. Representative responsibilities and functions of the security controller 100 are:

User authentication B the security controller 100 may be involved with storing a number of log-ins and can acquire authentication information in connection with conducting the log-ins. The security controller 100 may trust an authentication service, entity or other resource that can maintain a set of credentials for each log-in and inform the security controller 100 regarding the identity of each log-in. In such a way, the security controller 100 manages identities. For example, the log-in might be performed when the ignition of the vehicle is activated and the authentication services are provided by the owner of a taxi fleet. As another example, a smart card might perform the log-in using a central hospital as an authentication service, which is trusted by the security controller 100. The security controller 100 may store user identification information in one or more of a number of forms including a personal identification number (PIN) smart card, password or by means of biometric information. This information can be passed to the security controller 100 through one or more apparatuses or devices communicating with the communication services module 32, such as the cellular phone 24, W-LAN subsystem 36 and/or the W-PAN subsystem 38 or, alternatively, through the human/machine interface services module 64 that can receive vehicle user identification information from the human interface 40.

Secure location and time B either as an integral unit or as a stand-alone device with which it communicates, the security controller 100 can communicate with a GPS receiver (e.g., GPS 70). This receiver provides a secure source of location and time information. The GPS receiver is configured to eliminate or minimize tampering with the information that it provides. This trusted time and location information can be used to check against any location restrictions that might apply to certain resources in the vehicle.

Security monitoring B the security controller 100 monitors common bus 96 activity and vehicle bus 84 activity between or among resources to ensure that the security conditions established during configuration or authentication continue to be met over time. For example, if there were a time condition related to bus activity, the security controller 100 could dynamically discontinue the secure channel connection after a predetermined time event.

Bus arbitration B the security controller 100 can provide arbitration between high priority and low priority activity on one or more buses located in the vehicle. For example, when there is an emergency, the security controller 100 might halt all low priority activity, such as digital audio or video.

Application authentication (public key infrastructure) B the security controller 100 contains a registry of digital credential information associated with registered resources. When an application requires secure access to the common bus 96, it presents its credential, or certificate indicative of such credential(s), to the security controller 100. Generally, access to the common bus 96 is denied unless all traffic on the bus 96 is encrypted. The security controller 100 is responsible for ensuring security on the bus 96, while applications listen to encrypted traffic. The security controller 100 may reject an application requesting access to the common bus 96 on a number of grounds, such as an invalid certificate authority signature, invalid or unknown properties, time expiration or revocation of the certificate. If the certificate is deemed authentic, the security controller 100 requests that the application prove that it is the principal of the credential by presenting valid access information, such as performing a cryptographic operation using the associated private key. Upon successful response, the security controller 100 can open a secure channel with the application for future transactions or transmissions. In the case of Internet applications, laptop usage, PDA usage, or consumer applications, each individual application is required to authenticate with the security controller 100. A more detailed description of digital certificates will follow herein. A related embodiment for application authentication involving a federated architecture will also be described.

Multiple keys B the security controller 100 can also require more than one key or other security tool to be able to access one or more functions. More than one factor or requirement may be necessary to authenticate an application or a particular entity/user. For example, configuring the settings for a vehicle may require the physical presence of a particular phone (first factor) as well as a particular PIN or password entered through the human interface 40 (second factor). Additional factors may include time, location information, biometric information from the operator or user (fingerprint, voice print, facial print and the like) or third-party information, such as may be required over the Internet, before authentication of a user.

Multiple resources B the security controller 100 can enable multiple resources to participate or be associated with one application. For example, executing a navigation application might require authentication of software running on a display of the operator unit 40, the vehicle gateway 80 and the GPS 70. Many other examples are feasible including using an application that requires GPS location and GPS time.

Multiple public key protocols and algorithms B the security controller 100 may utilize or be aware of several public key infrastructure (PKI) protocols while a particular resource may have information about only one such protocol. This allows application providers to select from a number of protocols and algorithms as are appropriate for their communications. However, a single algorithm can be chosen so that there are proper communications once a secured channel has been established.

Carry-in device firewall B to support any interface to a computer 74 that can be used in the vehicle, security firewall functions can be built into the security controller 100. The firewall protects resources in the vehicle from invalid, unwanted or malformed requests. Applications running on such carry-in computers that require access to services and information provided by the system 20 require certification. The security controller 100 handles authentication and key exchange with such applications. If a particular application is not certified, the security controller 100 can allow certain, predetermined vehicle services to be made available to non-certified applications.

Figure 2:
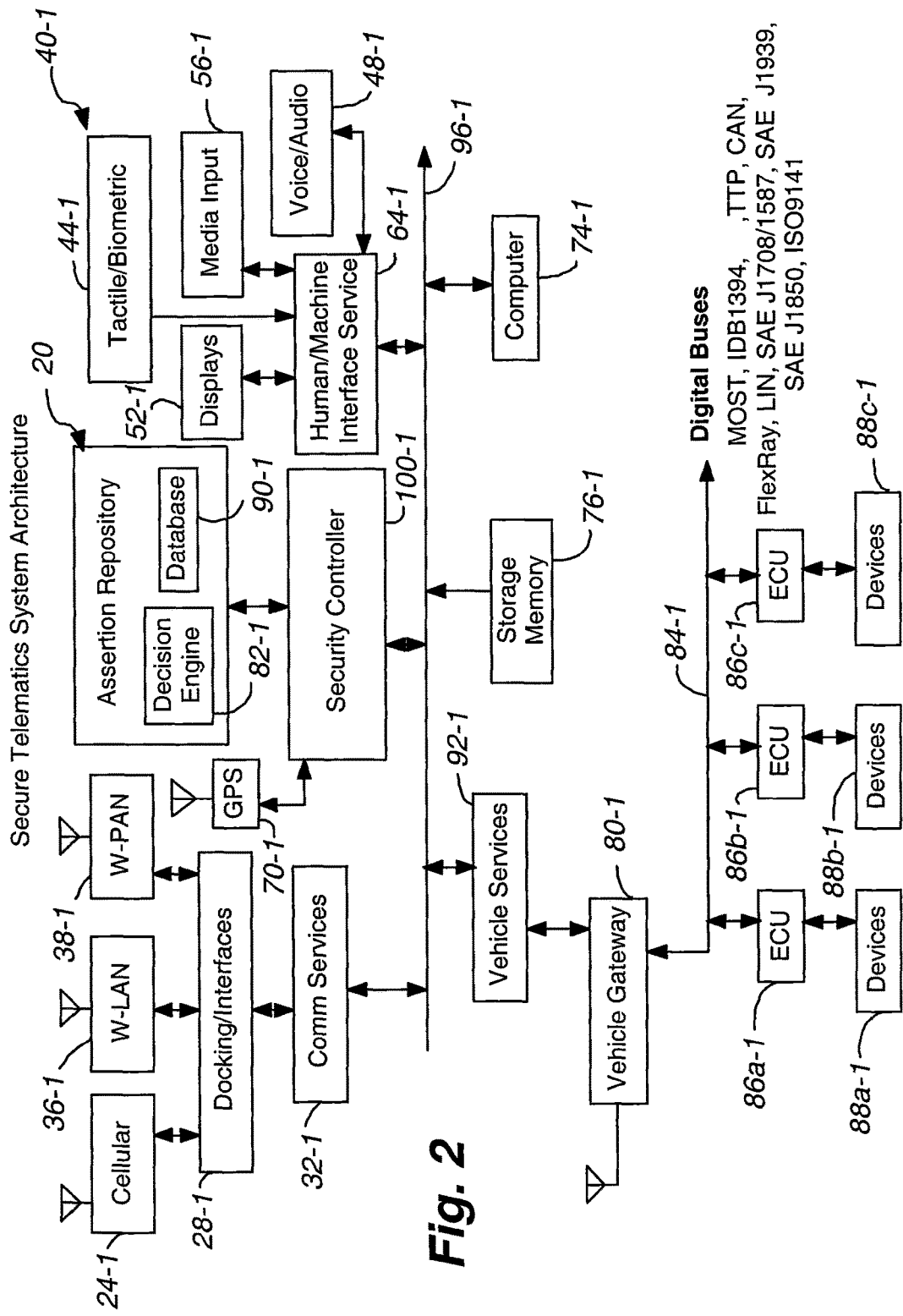
FIG. 2 is a block diagram of another embodiment of the system in which the security controller implements security functions for the system but is not a central hub or switch.

With reference to FIG. 2, another embodiment of a telematic secure system 20-1 is illustrated. The security controller 100-1 is included in the system 20-1 as another apparatus or resource on the common bus 96-1. According to this architecture, the security controller 100-1 performs all the security functions that are available in the embodiment of FIG. 1. However, the security controller 100-1 does not serve as a switch on the common bus 96-1, unlike the FIG. 1 embodiment. This can be a drawback to the effectiveness of the security controller 100-1 since its ability to isolate segments of the common bus 96-1 does not exist inasmuch as it is no longer a switch or central hub through which all communications pass between and among resources on the common bus 96-1. However, multiple key authentication, location-based authentication and certificate management can still be performed by the security controller 100-1. In another embodiment, the security controller 100 may also be merged with any one of the services modules, for example, the communication services module 32, the human/machine interface services module 64 and/or the vehicle services module 92. This configuration has the advantage of improving the authentication with the resource that it is merged with since no authentication is required as they constitute the same resource. On the other hand, like the embodiment of FIG. 2, the ability to isolate the common bus 96 is lost.

Main functions performed by the security controller 100 relate to authorization for access to and use of the telematics secure system 20. To perform these functions, the security controller 100 can rely on certain tools involving previously granted digital certificates or other digital security assertions or credentials. A certificate evidences a grant of properties or rights for accessing and using the system 20. A certificate may apply to a resource, such as an application that is to run in the vehicle using one or more other resources or a proprietary subsystem that is included with the vehicle and which may or may not be removable, e.g., a subsystem that is an add-on to the vehicle by an entity different from the manufacturer of the vehicle. A certificate may also be made available that applies to an entity who has generally established itself as meeting all requirements, including safety and security requirements, for access to and use of resources with the vehicle. In the case of an entity being certified, the resources from this entity may be deemed acceptable for use with the vehicle in the case in which the entity has a proven record of meeting requirements for resources available from it.

Generally, a digital certificate is presented to the security controller 100. The certificate can apply to a resource such as an application. The security controller 100 determines whether the presenter (e.g., owner or licensed user of the application) of the particular certificate has the rights associated with the certificate. Once this verification or authentication scheme is satisfied, a secure channel of communication may be established for the application. The secure channel can include use of adequate encryption.

The certification process involves a number of procedures and tools. An important part is establishing or identifying a certificate authority (CA) that provide certificates for use in the secure telematics system 20. The CA is responsible for issuing certificates to approved resources for use in the vehicle and/or entities that provide such resources. The CA can revoke the rights of previously authorized resources and/or entities when certain violations or breaches are determined. The CA is involved with the following, at least some of which will be the subject of later explanation: the security of certificate authority private signature keys; the security of a public key list; the ability to verify that a certificate presenter possesses the associated private key; the ability to assign reasonable properties with each certificate; the ability to automate responses to requests in order to satisfy a large number of certificate requests; and the ability to designate another or secondary CA that is authorized to provide certificate authority functionality instead of the primary CA and which ability can be used to lower bandwidth requirements on the primary CA. The CA can include one or more of a number of entities including one or more vehicle manufacturers, application developers, service providers and representatives thereof, as well as one or more third parties that are independent of vehicle manufacturers and vehicle resource suppliers and/or developers.

Procedures and processes associated with certification are next discussed, particularly in the context of a certificate or other security credentials or assertions being provided for one or more applications that are intended to be executed within the secure telematics system 20, although it should be appreciated that such processes and procedures can be adapted to apply to other resources and entities associated with such resources. The main certification processes include: the CA being initialized with one or more CA signature keys; the CA issuing a set of keys to an application developer that allows such applications to make certificate requests; creating a certificate request by the application and delivering it to the CA; and the CA granting the certificate request and returning it to the application.

With regard to the CA signature key(s) creation process, the CA has a signature key or set of signature keys that are used to sign certificates. The CA signature key generation process is performed once and the key or keys are stored in a physically secure manner. The signature key creation can include the CA creating a CA signature public key (CASPK) and CA signature private key (CASRK) key pair. After its creation, the CA stores the CASRK in a secure manner. The CASPK is delivered by the CA to the security controller 100 where it can be used to verify signatures of certificates that are submitted to it. Multiple CA signature key pairs can be generated which allow a diversity of signatures on certificates. In such a case, a list public keys is embedded with the security controller 100 for verification and a CA signature key index is added to the certificate.

Next regarding enablement of the generation of certificate requests, certain security tools or information are provided to the developer of the application that is to be a resource for the vehicle. However, before providing such access tools or other information to the developer, the particular application is first approved. In one embodiment, the approval procedures are conducted by an entity different from the CA. This different entity may be termed an application verification authority (AVA). Alternatively, the CA is also responsible for application verification or approval. Regardless of the identity of the entity or entities, it is authorized and responsible for ensuring that applications entering into the system 20 are safe, secure and operate within predetermined guidelines. The approval of the AVA, whether it is the CA or another entity(ies), is obtained before the CA can issue a certificate for the application. Approval from this authorized authority can require the following main processes: submission of the application to the AVA by the application developer; auditing of the application developer security practices by the AVA; testing the application by the AVA in a number of environments involving the system 20 for behavioral and safety determinations; providing written notification to the application developer by the AVA when corrections are required before approval can be granted; and upon passing AVA verification, the CA is notified of application approval, in the case in which the AVA is different from the CA.

With respect to the application submittal process, an application developer is required to request that its application be allowed to enter the secure telematics system 20. The request requires submittal of the application accompanied with written documentation that can comprise the following: a mutual non-disclosure agreement, a copy of the application, a complete description of the application, one or more reasons for the application to be part of the system 20, the set of properties and/or rights that the application requires to perform its function(s) and a description of the security infrastructure used to protect one or more private keys.

Regarding the application approval process, the AVA performs a security audit before granting the application developer the ability to enter the system 20 and which audit can include: visiting the application development site by the AVA to make sure that proper security precautions and procedures are in place including to ensure that the protection of keys at the development site and/or at the manufacturing site is sufficient; reviewing the security firmware or other software by the AVA that is related to the protection of one or more keys; and testing of the application in a number of secure telematics system environments to make sure that the application does not jeopardize safety within the vehicle and that the application is sufficiently behaved within the system 20.

Also with respect to approval, certain relevant factors are considered and/or noted. First, approval of one version of an application does not automatically grant approval to one or more later versions. Secondly, any application that has received a certificate may be subject to tampering. Members of the hacker community may try to modify the application to make it perform in unexpected or undesirable ways. One or more members of the developer community may modify their own applications after obtaining a valid certificate. The modification may take the application outside the original specifications or result in security flaws that expose the application to unwanted hacking or attacks. To enforce compliance, the AVA can compute a secure hash of portions of the application and provide that hash to the CA for incorporation into the certificate. Once deployed in the field, the application is required to submit the same portions of itself to the security controller 100. As part of authentication, the security controller 100 computes the same secure hash and verifies that it matches the value or properties within the certificate.

The application approval process can also entail adherence to guidelines for application developers and guidelines for applications, together with implementation considerations. In that regard, developers of applications may be required to provide for the physical security of keys within their development facilities and manufacturing facilities. For example, gaining physical access to such keys might require a minimum of two persons present at all times. Application developers are to be cognizant of the kinds of attacks that the application may be subjected including communication channel tapping, entity spoofing, denial of service attacks (e.g., network overloading), software or firmware emulation and diagnostic back doors. Application developers may be required to partition the application into modules that fall within the jurisdiction of the verification authority and those that fall outside the jurisdiction of the verification authority. A clear partitioning allows the developer more abilities to revise modules that fall outside the jurisdiction of the verification authority version control mechanisms. Developers of applications can be required to implement a secure download procedure for field updates since a secured download procedure prevents unwanted applications from entering into the secure telematics system 20.

Guidelines for applications can include being sensitive to or highly compatible with the vehicle environment. For example, an application may only be appropriate when the car is not moving and be inappropriate when the car is moving as there may be some distraction to the driver. Each application is required to protect its key or keys such as by means of hardware protection, key obfuscation and encryption techniques. Each application may be required to be aware of priority schema within the system 20. Some applications may be considered low priority and can be terminated by high priority applications.

Regarding application implementation factors, the verification authority can be responsible for behavioral auditing, security auditing and safety auditing. The verification authority might rely on software and hardware tools to conduct verification or auditing procedures intended to meet these objectives.

Once the developer is determined to have met the requirements of the verification authority, the process related to generating one or more certificate requests can continue. In particular, the CA creates a certificate request public key (CRPK) and a certificate request private key (CRRK) pair. Concomitantly the CA assigns the key pair a certificate request identifier (CRID). After generation of the key pair and the identifier, the CA delivers the CRID and the CRRK to the developer through secure procedures, paths or means. Such security may involve delivery in person, or through a separate secure channel established during an on-site visit. The CA also creates a new entry in a local database that can be labeled certificate request public key list (CRPKL). The new entry is linked to the developer's CRID for future access capability. The unique identifier may be the next available index to the CRPKL or it may be a globally unique identifier (GUID) or any other unique value that may be used to look up the associated CRPK. The new entry can include the following information:

(a) the CRPK associated with the application;

(b) the properties of the certificate to be granted. A property range may be entered which limits the range of requested property values, rights and/or obligations that may be issued by the CA. These properties become part of the certificate when a certificate is granted for the particular application; and/or (c) any additional rules associated with the granting of the certificate(s) for the application. These can include a maximum number of certificates to be granted, a limited time period in which to grant certificates and a requirement that a financial transaction be confirmed (e.g., compensation or fee to be paid) prior to issuing the certificate.

Such information can also include a secure hash of the application. The secure hash involves the reduction of a large amount of data to a small number of bits in such a way that it is mathematically extremely burdensome to revert to the large amount of data without authorization. A secure hash value may be encrypted using a secure session key in order to create a "message authentication code."

As previously noted, the certificate to be granted has a number of properties or rights. The properties in a certificate may include any amount of information: a unique identifier for the owner of the certificate; the priority level assigned to the application where a higher priority application receives bandwidth allocation before a lower priority application; expiration date and time of the certificate; geographic location where the certificate is valid; wireless LAN "hot spot" identifier where the certificate is valid; other resources that are part of the system 20 that the application needs to communicate with to function correctly (the security controller 100 uses this information to open a common secure channel with all resources required for an application to run correctly); APIs that the application is allowed to use whereby restricting access to certain APIs reduces the security risk of some certificates, e.g., a certificate that only grants access to commands that read the state of vehicle information involves a lower risk than a certificate that grants access to commands that control vehicle services to perform one or more functions; and/or additional authentication that may take the form of user confirmation procedure, or external third-party authentication procedures.

Once an application developer has been granted the right to utilize the system 20 by means, for example, of receiving a CRRK, it may obtain a certificate by issuing an application certificate request to the CA. The certificate request process varies depending on the type of application that is receiving the certificate, where the application receives its certificate and how the application is distributed. Applications may request certificates that involve the following:

an application embedded within an electronics subsystem may request a certificate from the CA during its manufacturing process so that the application ships in a state that is acceptable for use within the secure telematics system 20.

an application that is to be distributed through a hard medium (e.g. CD-ROM or DVD) undergoes a single certificate request process that is managed by the application developer. As part of its distribution, the certificate and one or more keys are embedded into the application.

an application may be distributed through a WAN, LAN, or PAN network. The application developer can choose to obtain certificates for the application dynamically at download or perform a one-time certificate request similar to a hard medium distributed application.

an application may request a new certificate while running in the end-user environment. The application may require a new or updated certificate to gain access to the system 20. This ability allows an application to be enabled by the user in the field by obtaining a new or updated certificate, which may include payment of a fee.

Regardless of whether the application or the application developer is requesting a certificate, fundamental steps can be implemented that are applicable for virtually all applications including those just identified and which include the application creating a certificate public key (CPK) and a certificate private key (CRK) key pair; the application securely storing the CRK into non-volatile memory; the application creating a certificate request that includes the following components: the CRID that identifies the requestor to the CA, the CPK that is the application's public key, other certificate properties that are required, and a certificate request signature (CRS) that is created by digitally signing all the above-noted information using the CRRK as the key, with the CRS being used to authenticate the requester to the CA; and the application delivering the request to the CA and which request does not necessarily require a secure channel for transmission.

With respect to the certificate creation, the CA retrieves the CRPK properties, rules and secure hash from the database using the supplied CRID as a lookup parameter. The CA also validates the CRS using the CRPK. The CA verifies that none of the rules associated with the CRID have failed. For example, the CA verifies that the time period in which the CA grants certificates has not expired. Further, the CA verifies that the requested properties are within the scope of the properties agreed upon during the request to enter into the secure telematics system 20. An application may be unable to ask for a certificate over a certain expiration time. The CA creates the certificate including the properties in secure hash, as well as digitally signing it with a CA signature private key (CASRK). After the foregoing are implemented, the CA returns the completed certificate to the requester, which return may be conducted across an insecure channel. After receipt, the application is expected to verify that the public key in the certificate matches the CPK that was originally part of the certificate request and verify the authenticity of the certificate by verifying the CA signature.

With receipt of the certificate, the application can gain access to the secure telematics system 20. Generally, this includes interaction with the security controller 100. In particular, the certified application sends a service request with the certificate to the secure controller 100. The secure controller 100 can return a challenge request to the application that includes a random number encrypted with a public key. The application decrypts the random number using its local private key. The application sends back to the controller 100 a random number response. If the random number received by the controller 100 in response from the application matches the number encrypted for challenge then the service request is granted. Once granted, the controller 100 sends an indication of a service or session to be initiated to the application.

Certificates usually last until the expiration date. However, there can be predetermined conditions under which a certificate is revoked. By way of example, an application that has been compromised, such as where its private key has been exposed, may be required to be revoked. The CA can maintain a certificate revocation list (CRL) that can be embedded within the security controller 100. The security controller 100 consults the CRL during its authentication process to ensure that the application has not been revoked. Updating the CRL may be supported by including a requirement for additional third-party authentication within the certificate itself.

Certificate creation might utilize currently available tool kits that provide security code that can be required for the application developer. These tool kits can include RSA's Cert-C and Certicom's TrustPoint.

Generated certificates can have other uses including the tracking of fees, payments, royalties or other compensation requirements. In cases where proprietary resources are to be accessed within the system 20, the issuance of the digital certificates may be used to indicate that such a proprietary resource is to be accessed and/or used. Each time a certificate is created for an application, an entry is made into the certificate database. The database may be queried to retrieve the number of certificates issued that allow access to proprietary resources and a previously determined fee or royalty may be levied in conjunction with such access or use.

The secure telematics system 20 enables secure applications to be used in a safe manner with one or more other resources associated with the vehicle. Additionally, incentives are provided to owners or others who have proprietary interest in resources to make available their proprietary resources to control the access in use. The proprietary resources, in contrast to non-proprietary resources, are resources in which one or more entities has a legally protectable proprietary interest in the resource. The legally protectable proprietary interest can be based on one or more legally recognized intellectual properties including patents, trade secrets, copyrights and contract-based rights. Resource usage and expansion thereof, particularly use of proprietary resources, is fostered by establishment of relationships with entities that can be involved with the telematics secure system 20. These entities can include vehicle makers, communication device vendors, communication services providers, proprietary subsystem suppliers, application developers and vehicle users. Establishment of relationships can include the definition and acceptance of conditions by the entities. Conditions, such as rights and obligations, can be different for different entities or groups of entities. These conditions might include sufficient descriptions or identifications of the resources that can be used; compensation-related factors associated with usage; duration of use; specific definitions or limits of use that can be made of proprietary resources; geographic limitations that define locations within which use can be made; remedies for non-compliance with one or more conditions; and other relevant requirements including obtaining certification as previously discussed including approval of proprietary resources, such as applications, by a designated authority.

With the proper establishment of relationships in place, together with acceptable security, various uses and/or applications of the telematics secure system 20 can be identified and advanced. For example, a vendor of after market audio equipment may desire access to proprietary and/or non-proprietary resources in the vehicle in order to interface the vehicle radio to controls and displays associated with the operator or head unit 40. The add-in radio maker may also desire access to the vehicle audio system and hands-free features, such as hands-free cellular telephone usage, that are already contained in or embedded with the vehicle, including voice recognition. Further, access to a vehicle PDA interface may be desirable to allow upload and/or download of personal or other desired data. Such resources can be made available to the after market supplier based on approval of the radio application and obtaining a digital certificate that works with the security controller 100. In this case, the vehicle maker, as an entity having one or more proprietary interests in one or more proprietary resources associated with the vehicle, can establish a relationship with such a vendor utilizing appropriate conditions including conditions that provide incentives to the vehicle maker, e.g., revenue to be received for such access and use that might be in the form of a one-time fixed payment, by subscription and/or when the vehicle is resold.

Numerous other applications can be identified or described that might involve applicable resources to be used with other resources associated with the vehicle. There can be many general application areas including related to security, multi-user, geographical, regulatory, communication and commerce. One or more applications may fall into more than one of these groups or categories and other applications may not be clearly delineated into one or more of them. Some representative applications are next described.

Vehicle configuration B the cellular phone 24 is available to send configuration information into the vehicle. This configuration information may include driver identification, seat position, mirror positions, radio station pre-sets and use of other subsystems or devices located in the vehicle. Upon receiving the information, these can be adjusted under commands from the telematics control unit 80 or other vehicle-resident computing devices. Such an application may require the following steps:

1) The cellular telephone 24 is placed in a cradle with power on.

2) Operator identification is entered, such as a "PIN", biometric, smart card, voice command and the like.

3) The cellular telephone 24 receives this information and the vehicle configuration application is initiated.

4) The security controller 100 authenticates the configuration application using, for example, appropriate key exchanges.

5) After successful authentication, the security controller enables or authenticates a communication channel with the gateway to the appropriate bus, vehicle bus or buses 84, which can be the vehicle gateway 80, if a secure session is not already in progress.

6) The security controller 100 chooses a common encrypted session key and distributes it to the cellular phone 24 and the vehicle gateway 80.

7) The vehicle configuration commands are sent from the cellular phone 24 to the vehicle gateway 80 via the secure, encrypted channel.

8) The vehicle gateway 80 may verify, when desirable or appropriate, that configuration adjustments are to be performed only when the vehicle is stationary.

9) As part of the overall access and use involving the configuration application, a user acknowledgment might be required before any such adjustments are implemented.

Another representative example of an application can involve the activation of an inflator system, such as an air bag in the vehicle, which triggers a notification that is sent to a designated entity or authority. Relevant steps for this application include:

1) During system initialization, a secure alarm channel is established involving the GPS 70, the vehicle gateway 80, the security controller 100, and the communication services module 32 for use during an emergency.

2) When a sufficient vehicle impact is detected, an air bag of the inflator system is activated or deployed.

3) The vehicle gateway 80 receives one or more air bag related alarms from this vehicle device, which may occur across an embedded vehicle bus 84 when the inflator system is connected thereto.

4) The security controller 100 receives the alarm by way of a secure connection.

5) The security controller 100 obtains GPS information from the GPS 70 and delivers it to the communication services module 32. The communication services module 32 initiates communications to notify the remote designated entity or authority of the vehicle using the cellular telephone 24 or other communications subsystems, such as the W-LAN and W-PAN subsystems 36, 38.

A navigation application involving a subscription service can also be implemented. By way of example, a vehicle can be sold with a GPS and a navigation application built into the human interface 40. For the application to continue to work, the subscription must be renewed. A real time certificate is obtained from the certificate authority by creating a certificate request that is validated based on a verifiable financial transaction. Certain steps are next described related to this application:

1) The vehicle user is notified that the navigation subscription is about to expire and is offered the opportunity to continue the service for another term, such as one year of service.

2) The user accepts the offer by entering electronic payment information, such as a credit card number. Secondary user authentication may be required to ensure that the user is allowed to make the transaction, i.e., the user is the owner of the vehicle.

3) The application requests a secure channel with the financial institution through the communications services module 32. The security controller 100 enables this transaction by opening a common secure channel between the application and with the financial institution through the communication services module 32.

4) The application and financial service communicate through the secure channel to charge the user's account.

5) The financial service responds with a confirmation number for the charge.

6) The application creates a certificate request to the certificate authority including the confirmation number of the charge as a receipt of the financial transaction.

7) The application sends the certificate request to the CA, which does not require a secure channel.

8) The CA receives the request, verifies with the financial institution that the charge occurred and issues a one year certificate for the application.

9) The application presents the new certificate to the security controller 100 to enable access by the application to the GPS 70.

10) The CA distributes the subscription notification to the vehicle maker and application developer for possible fees that might be due including royalties.

The secure telematics system is also involved with certificate-related procedures including assertion repository updates and certificate revocation lists that may involve the following:

1) The system 20 receives notification that an update to a certificate is available. This notification can be received via a wireless link or wired connection such as involving a vehicle or digital bus.

2) The vehicle user can be notified that the update is available and may acknowledge and/or approve the upload of the update.

3) The source of the software or the certificate is authenticated by the security controller 100.

4) The upload might be constrained by location such that it occurs only when the vehicle is located within a certain geographic region. In such a case, the certificate presented for the application to be uploaded contains the identification of the required geographic region.

5) The upload can also be constrained by time whereby uploads are only allowed within a certain period of time.

6) A secure session involving an encrypted communication is set up between the certificate source and the security controller 100.

7) The update is loaded into the security controller, which may be a new certificate and/or a certificate revocation list.

8) The security controller 100 authenticates the certificate and/or CRL by means of a digital signature.

9) Optionally, a third party might be consulted to verify authenticity.

10) The security controller 100 stores the new certificate and/or CRL in its non-volatile memory.

Similar procedures or steps can be utilized for an application update. Updates may also be requested by the security controller 100 for expired certificates. Certificates may expire after a predetermined date, which can be useful for subscription-based services. In such cases, a secure time source is necessary, such as the embedded GPS 70. Wireless communication network clock verifications at local hot spots might also be utilized.

Further applications are next described according to groups or categories. The following relate to security applications:

Secure VIN for warranty and quality control B the vehicle maker uses the security controller 100 to ensure that the integrity of stored information related to warranty and quality assurance has not been compromised. An activation log could be included that documents automatic collision notification being sent to a designated entity or authority. The secure VIN certificate/key can be loaded at the vehicle maker's plant.

Access to car information for vehicle user application B the car maker can use the security controller to grant access to vehicle information, driver information and vehicle control only to the authorized owner. Essentially this can be the secure key to the vehicle for the owner or other authorized user. One example might be to unlock vehicle doors using a cell phone or PDA.

Secure access for diagnostic tools B the vehicle maker can use the security controller 100 to grant access to diagnostics information and vehicle configuration only to authorized dealers with authorized tools.

Access for service provider applications B the vehicle maker can use the security controller 100 to grant access to vehicle information, driver information and vehicle control to authorized service providers with authorized tools.

Access to user interface resources B the vehicle maker can use the security controller 100 to grant access to the vehicle user interfaces only to authorized applications and devices. The vehicle maker may limit the risk for accidents due to driver distraction, e.g., allowing a cell phone to be controlled by steering wheel buttons or built in voice recognition.

Secure fleet vehicle status B a fleet operator can use the security controller 100 to control access to each vehicle and load status data for its fleet. This information can be securely stored in the vehicle memory 76 and only accessed by authorized entities.

Secure position data for fleet management B the fleet operator can use the security controller 100 to control access to position data of its fleet. The position information can be securely stored in the vehicle memory 76 and only accessed by authorized entities.

Protection of position data B the car owner or other authorized user can use the security controller 100 to control access to position data of the owners vehicle. The position information can be securely stored in the vehicle memory and only accessed by authorized entities.

Vehicle tracking and security B internal GPS assets, vehicle bus access and vehicle telecommunications can offer many levels of vehicle safety and security such as being aware of the current location of hazardous materials being transported by trucking companies.

The telematics secure system 20 is adaptable for multi-user applications including:

A number of authorized vehicle users-resources associated with the system 20 can be specially and uniquely configured for each authorized user of the same vehicle, for example, in providing communication options such as: filtering of "hot spots" for each user based on the particular user's special interests; limiting or presetting vehicle controls for each family member, valet or authorized vehicle operator; and subscriptions associated with particular user authentication.

Rental car customization B the rental vehicle user can interact with the rented vehicle in order to use a personal cell phone and/or upload a personal directory for radio station preferences.

The telematics secure system 20 can be accessed for geographical and/or regulatory applications which might include:

Traffic information subscription B various levels of traffic maps, warnings and special routings can be displayed using a navigation display screen that might be part of the operator unit 40.

Vehicle pollution control B the system 20 might be accessed to modify or adjust controls in the vehicle in order to reduce emissions or switch the vehicle to electric power.

Current road conditions B advanced warning of upcoming road construction or major accidents can be provided using a wireless link warning station that can broadcast the relevant information at a distance from the construction or accident. The vehicle user or driver can be warned using a display or audio information by means of the human interface 40.

Weather conditions B advanced warning of weather hazards, such as fog, ice and/or snow can be provided using the system 20 so that the vehicle driver has sufficient time to take appropriate action including the possibility of changing to a different route.

Border crossing and inspection B governmental entities may use the security controller 100 to control access to vehicle data related to border crossings and weight inspection. Such information can be securely stored in the vehicle memory 76 and only accessed by authorized entities.

Smog testing B governmental entities may use the security controller 100 to control access to vehicle data related to smog tests. Such information can be securely stored in the vehicle memory and only accessed by authorized entities.

Another category of applications generally relates to communications where the vehicle can be considered a client that receives desired or requested information using wireless LAN network technologies or other protocols. Information to be communicated by downloads to the vehicle might include: music (such as MP-3 or WMA formats); address book entries; navigation system updates and personal navigation maps; document synchronization and updates; synchronization with the car PDA; updating online game status; updating and modifying vehicle permissions for authorized users; firewall permissions to control e-commerce applications for a particular user; driver validations and supporting group chats. A more specific example of a music download might involve an association with a particular geographic region. For example, based on location awareness of a vehicle entering Yellowstone Park, a special offer might be downloaded to the driver and passengers of the vehicle in the form of music that was compiled to enjoy as they travel through the park. Such a special music offering could be made using the secure telematics system 20 via a wireless communication network broadband link or the like to the vehicle occupants. After acceptance of the offering related to the special music, a fee associated with acceptance can be paid using the digital funds resource 78. After this occurs, the music is downloaded in an acceptable format to the operator unit 40 for subsequent playing.

Some e-commerce applications of the telematics secure system 20 are next described.

Vehicle as a service provider B with the vehicle having an assertion repository 78 that can be securely accessed by authorized entities, the vehicle can be a source of services that are paid for by transactions using the assertion repository 78. Such services might include those related to leasing, financing, repair and/or maintaining the vehicle. Such services may be basic navigation services and/or premiums for such services. The vehicle maker may be able to exercise appropriate controls over the vehicle when proper payments are not made (e.g., discontinue services, regulate vehicle usage). Additionally, the vehicle might have configured devices, subsystems and components that have activatable features provided that certain conditions including payments are met. These features might include making available extra engine horsepower for a certain period of time. Relatedly, vehicles that have the assertion repository 78 may require further validation related to entities or individuals that can use the assertion repository 78. Various biometric devices, such as a retina scanner, fingerprint verification or the like might be used to validate access to this resource.

Control access to consumer electronics devices B the maker of such device uses the security controller 100 to grant access only to authorized users. This may be a secure key to unlock premium features of a cellular phone or a PDA when located in the vehicle.

Toll payments B governmental entities may use the security controller 100 to control access to the assertion repository 78 for use in making toll and parking payments. Public and private transportation companies can also take advantage of the system 20. A WiFi link to an outside toll gate might communicate with the fare meter of a cab in determining the combination of trip distance fare as well as trip related toll costs. Additionally, the system 20 might send an electronic receipt to the cab passenger's PDA having WiFi capability.

Third-party services and promotions B the vehicle driver and any passenger can receive communications related to products and services that might be available including from business establishments that are within a predetermined distance or range of the vehicle. These subscription services and promotions can relate to digital coupons for gas station purchases, hot spot Internet privileges, menus of restaurants and their promotions, and communication offerings, such as free voice over IP long distance.

Multi-media downloads B music and video can be downloaded by subscription that is based on individual subscriber identification, which can be correlated with the driver and one or more passengers in the vehicle.

It should be understood that many other applications are possible and the foregoing applications are intended to be representative thereof. The telematics secure system 20 establishes the environment for numerous and diverse applications that might only be limited by the relationships that can be established and the resources that can be identified or devised for use with or for executing one or more of such applications.

The security controller 100 can also be configured as part of a federated architecture in which access to and use of resources is also based on one or more assertions or credentials, and/or set(s) thereof, provided by federation members. In this embodiment, the security controller 100 acts as a proxy or trust arbiter in authorizing and authenticating access requests to vehicle resources. In connection with authorizing and authenticating access requests, the security controller 100 can evaluate complex sets of assertions or security credentials that are provided by an entity or requestor. Based on the credentials, the security controller 100 can determine whether access should be granted or denied. An assertion is a signed bundle of information that is asserted to be true by a trusted principal. An assertion may only have meaning or be relevant to certain parties. Assertions can be categorized according to different levels or classes that are associated with concomitant rights, privileges and/or obligations. For example, the assertions can include identifiers or other information that associate the requesting entity with a particular class of service providers, such as vehicle maintenance members, transportation providers, vehicle fuel providers, and highway toll entities.

The security controller 100 can also be involved with assertions or security credentials on its own behalf or on behalf of other resources in the vehicle. Certain examples can include providing credentials that authorize release of vehicle location information and which need not include releasing the user or vehicle identity. The security controller 100 as part of a vehicle can operate in a federated security environment in which the member entities of the federation agree on the format and content of an assertion, such as security credentials or attributes. They also accept the protocol for exchanging these credentials. The security controller 100 can implement the protocols on its own behalf and on behalf of vehicle resources under its domain.

More specifically, the security controller 100 is able to issue certificates to resources in the vehicle using a signing certificate issued by a broadly recognized root CA. At the same time, the security controller 100 is able to understand embedded assertions about authentication and authorization in connected resources. The PKI model is still supported, as the PKC's issued to those resources are considered a subclass of the types of assertions that may be utilized by the security controller 100.

In one embodiment, when a new resource (e.g. device) is connected, it contacts the security controller 100, or vice versa, and a new certificate is requested. The decision whether or not to issue the certificate to that resource in that name is made by the security controller 100. This decision is based on the location of the resource (e.g. connected to one or more vehicle buses), input from the user (e.g. which would be asked, "Is the resource you just connected Radio 407b built by Acme Co.?", and could later be asked what to allow the radio to do), pre-embedded assertions in the resource that the security controller 100 can verify with the issuers, as well as other appropriate information. Using all these inputs, an intelligent decision with the maximum available information is made whether to grant the certificate.

Identity certificates should always be issued, but that authorization privilege associated with these certificates should be carefully partitioned. This is where the control and the business model can be elaborated. The security controller 100 decides based on certain information whether or not to grant certain permissions for unintelligent applications. For intelligent applications, it can act as the domain controller, allowing those clever resources to potentially decide authorization on their own in whatever fashion desired. Either way, the security controller 100 is a necessary component and there are several hooks in the allocation of permissions to various resources to utilize other resources where billing systems can be attached.

Making the security controller 100 able to issue its own certificates to resources in the vehicle greatly lessens the exposure of all the resources involved since new certificates can be easily and locally issued. If the issuer of the security controller's certificate is compromised, new certificates only have to be issued for the security controller(s) it signed for. Additionally, permissions and identities can be handled in a federated way: the radio manufacturer can bundle authorization assertions inside the radio which the security controller 100 can verify with the manufacturer and decide whether to trust.

Figure 3:
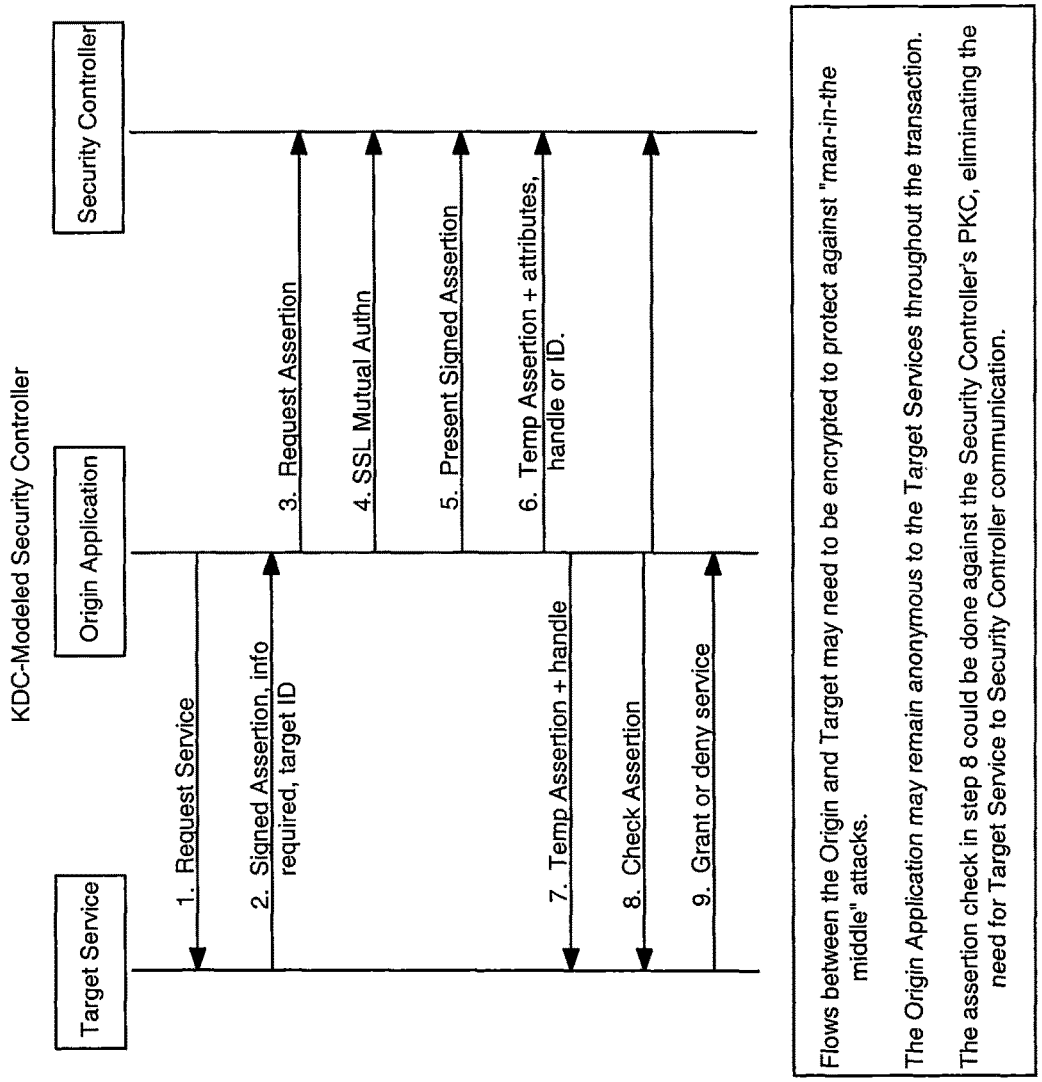
FIG. 3 is a diagram that illustrates steps and communications for authorizing/authenticating use of a target service by an origin application.

With reference to FIG. 3, a general description is next provided related to an application and operations in which the vehicle, under control of the security controller 100, is part of such a federation. The security controller 100 communicates with an origin or requesting application and a target provider, which can be a target service provider, a target product provider or other provider. Generally, the requesting application seeks to utilize the target provider for a particular function or activity. In connection with determining whether access by the origin application is to be granted, certain procedures are followed to ascertain whether or not the origin application is authenticated and has the authority to execute its application. Major steps for these procedures include:

1. The origin application contacts the target provider requesting some product, service, resource or other information.

2. The target provider sends the origin application a signed assertion with the name of the target provider and the information needed to allow access by the origin application.

3. The origin application contacts the security controller 100 to request a new assertion related to authorization by the origin application to use the target provider.

4. The security controller 100 and the origin application mutually authenticate using an established protocol, e.g. a secure sockets layer (SSL) for IP networking.

5. The origin application presents the assertion that it receives from the target provider to the security controller 100.

6. The security controller utilizes the assertion that it receives from the origin application to generate a new assertion for the origin application. This new assertion may include information about the origin application. Alternatively, the information may simply be related to an approval with reference to the original target provider assertion in order to maintain a high level of privacy related to the identity of one or more parties involved with executing the origin application.

7. The origin application presents this temporary assertion to the target provider, which may include an accompanying handle or other identifier.

8. The target provider verifies the temporary assertion by using information and checking it against the public key of the security controller 100. Alternatively or additionally, the target provider could check directly with the security controller 100 in connection with performing this verification. As part of this direct communication, additional information could be given to the target provider by the security controller 100.

9. Based on the information in the temporary assertion that it receives, the target provider grants or denies access to the origin application, which may involve one or more resources under the control of the target provider and/or services/products available through the target provider.

Figure 4:
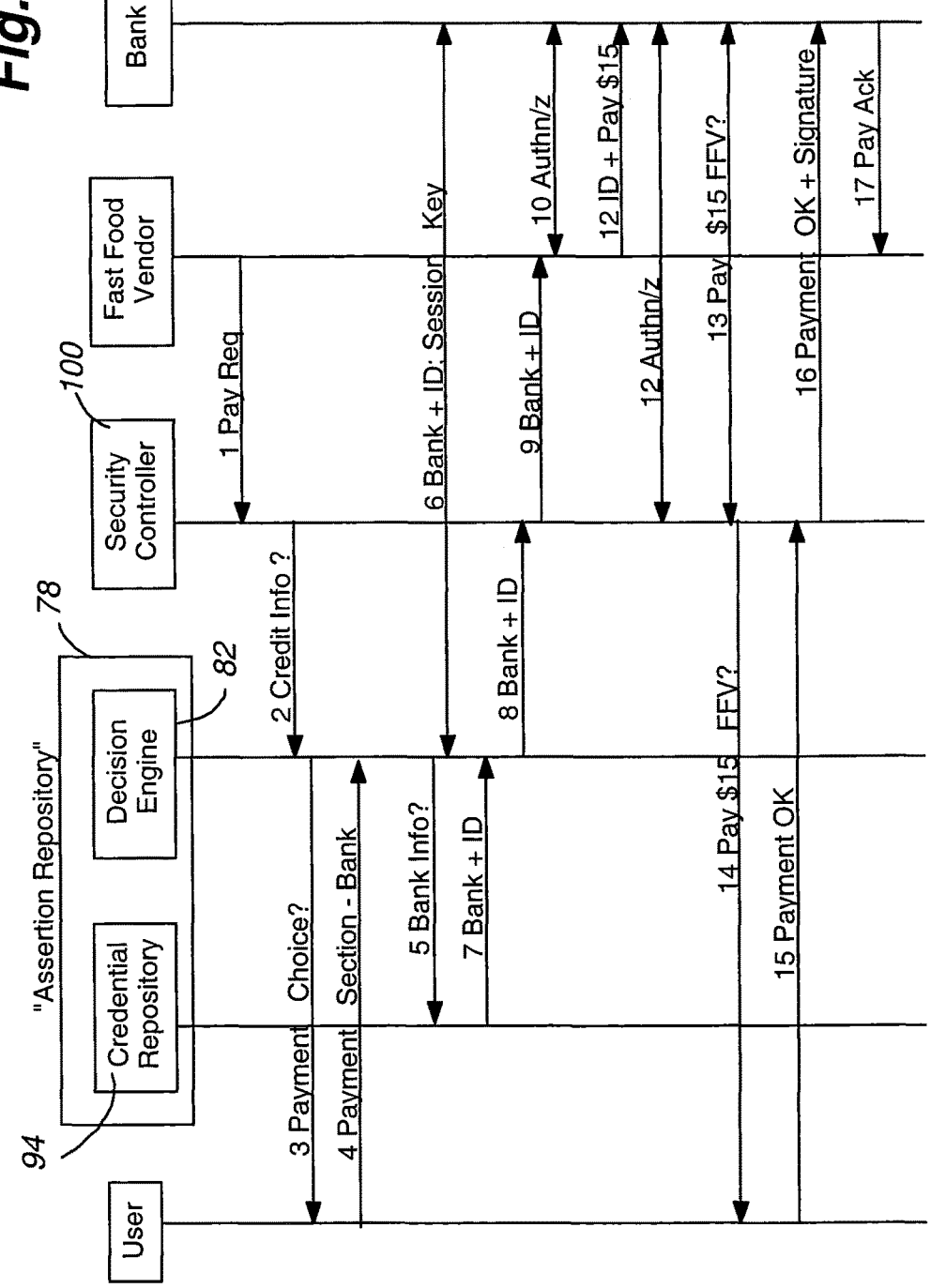
FIG. 4 is a diagram that illustrates steps and communications for securely purchasing a product (e.g., quick food purchase application) in a federated security framework.

Referring to FIG. 4, a more specific use of a federated architecture, particularly related to maintaining desired privacy, is described. According to this example, vehicle resources are used to pay for a product purchased by the vehicle user and, more particularly, to pay for food from a fast or quick food vendor. Entities that are part of the federation to provide a secure transaction involving this product purchase include a vendor, a financial institution (e.g., bank) and the vehicle itself through the security controller 100 and the assertion repository 78, together with the vehicle user who is involved with authorizing the payment. This transaction example includes the following steps:

1. The vehicle user or consumer places an order with the vendor, who requests payment.

2. The security controller 100 receives the payment request and can query the policy decision engine 82 related to payment information. The decision engine 82 can access the database 90 or other appropriate assertion or credential repository 94 in order to receive necessary verified or signed assertions based on the queries submitted by the security controller 100.

3. The decision engine 82 may provide the vehicle user with the payment amount and choices for making the payment, for example, using the human interface 40. Since no trust relationship exists between the vendor and the security controller 100, the payment amount and recipient are unsecured and untrusted. To establish the security and trust, the financial institution or bank is employed.

4. The decision engine 82 selects a bank account to debit for the purchase based on the user input.

5. Next, the decision engine 82 finds the bank account and connection information in the credential repository 94. Although the credential repository 94 is indicated as being part of the assertion repository 78, it can be located remotely of the vehicle and an authentication and authorization process would be required to obtain the necessary information from any such remote repository.

6. In one embodiment or optionally, security and anonymity can be enhanced by the decision engine 82, with the assistance and control of the security controller 100, communicating with the bank and obtain a temporary pseudonym to identify the transaction rather than utilizing a pre-established, persistent identifier.

7. Regardless of its location, the credential repository 94 returns to the decision engine 82 the name of the bank and the identifier associated with the transaction. In the case in which the credential repository 94 is remote relative to the vehicle, the decision engine 82 might access it using a wireless session by means of the security controller 100.

8. Next, the decision engine 82 provides the security controller 100 with the payment credentials that can include the bank name and the transaction identifier.

9. After obtaining them, the security controller 100 sends the payment credentials to the vendor.

10. The vendor authenticates and authorizes with the bank.

11. The vendor sends the bank payment credentials.

12. The bank authenticates and authorizes with the security controller 100.

13. The bank presents a payment request to the security controller 100.

14. The security controller 100 presents the payment request to the vehicle user.

15. The vehicle user accepts the payment request.

16. The security controller 100 indicates authorization of payment and sends it to the bank.

17. The bank acknowledges that the payment was made to the vendor.

Figure 5:
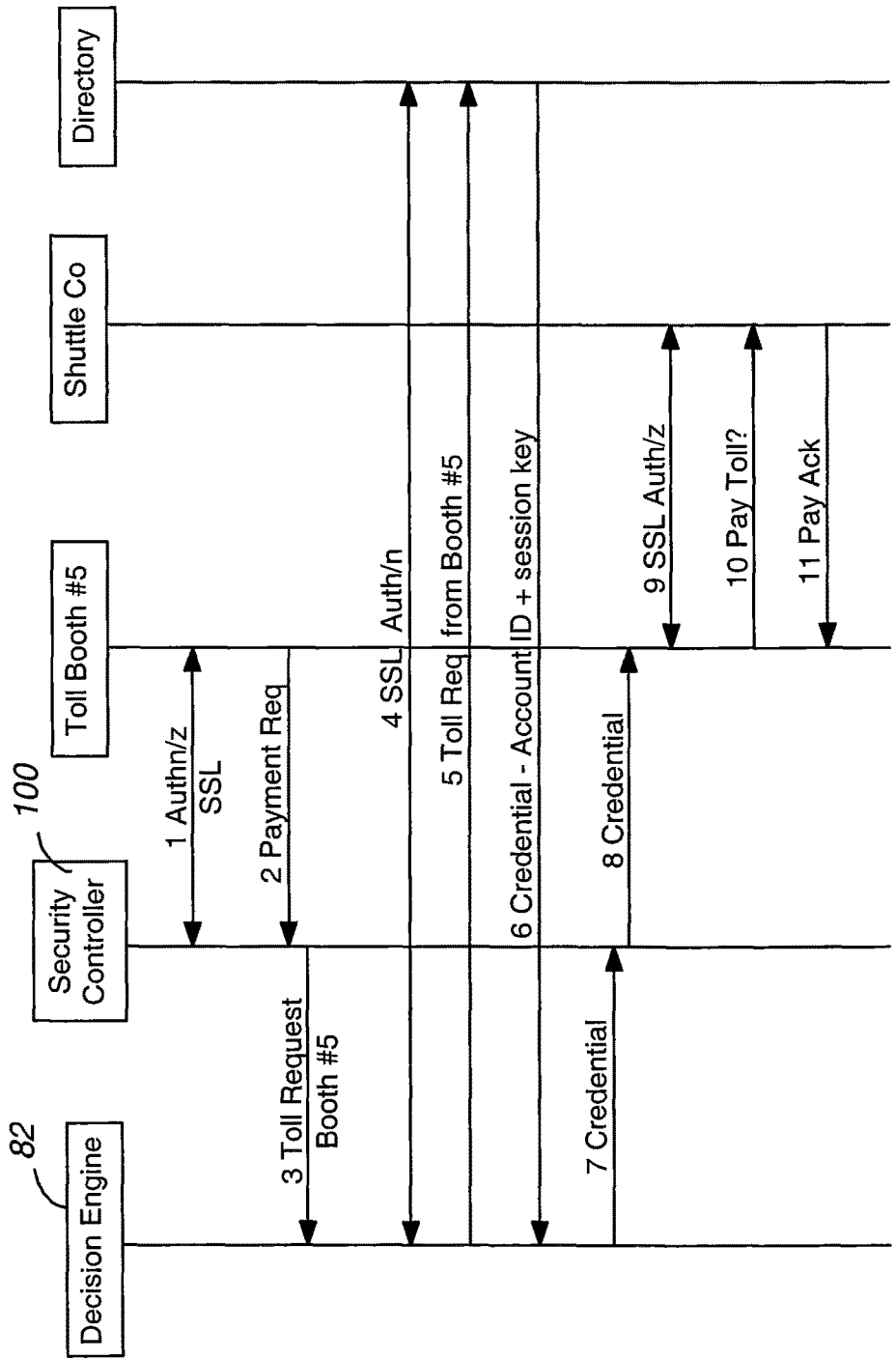
FIG. 5 is a diagram that illustrates steps and communications for securely making a toll payment in a federated security framework.

Referring to FIG. 5, another federated security transaction is described. In this example, a toll can be paid by the vehicle user in an anonymous manner. The members of the federation include a toll entity, a shuttle company associated with a directory and being involved with transportation, and the vehicle having the security controller 100, together with the decision engine 82 of the assertion repository 78. The steps and communications associated with this transaction example include:

1. The toll booth entity initiates an authenticated SSL connection with the security controller 100 utilizing mutually recognized certificate authorities.

2. The toll booth entity presents payment demand.

3. The security controller 100 queries the decision engine 82 for appropriate payment source.

4. The decision engine 82 initiates and establishes an authenticated secure connection with a directory that is remote from the vehicle.

5. The decision engine 82 presents the authorized assertion to the directory.

6. The directory generates credentials containing appropriate payment information signed or authorized by the shuttle company.

7. The decision engine 82 returns the credentials to the security controller 100.

8. The security controller 100 presents the credentials to the toll booth entity.

In one embodiment, additional validation can be made with the shuttle company itself before access is granted. Payment could then occur or transactions could be aggregated by the toll booth entity and present them to the shuttle company later based on their established relationship. In a related embodiment, instead of security credentials from the remote directory, persistent, cached assertions could be relied on that are immediately accessible by the security controller.

Figure 6:
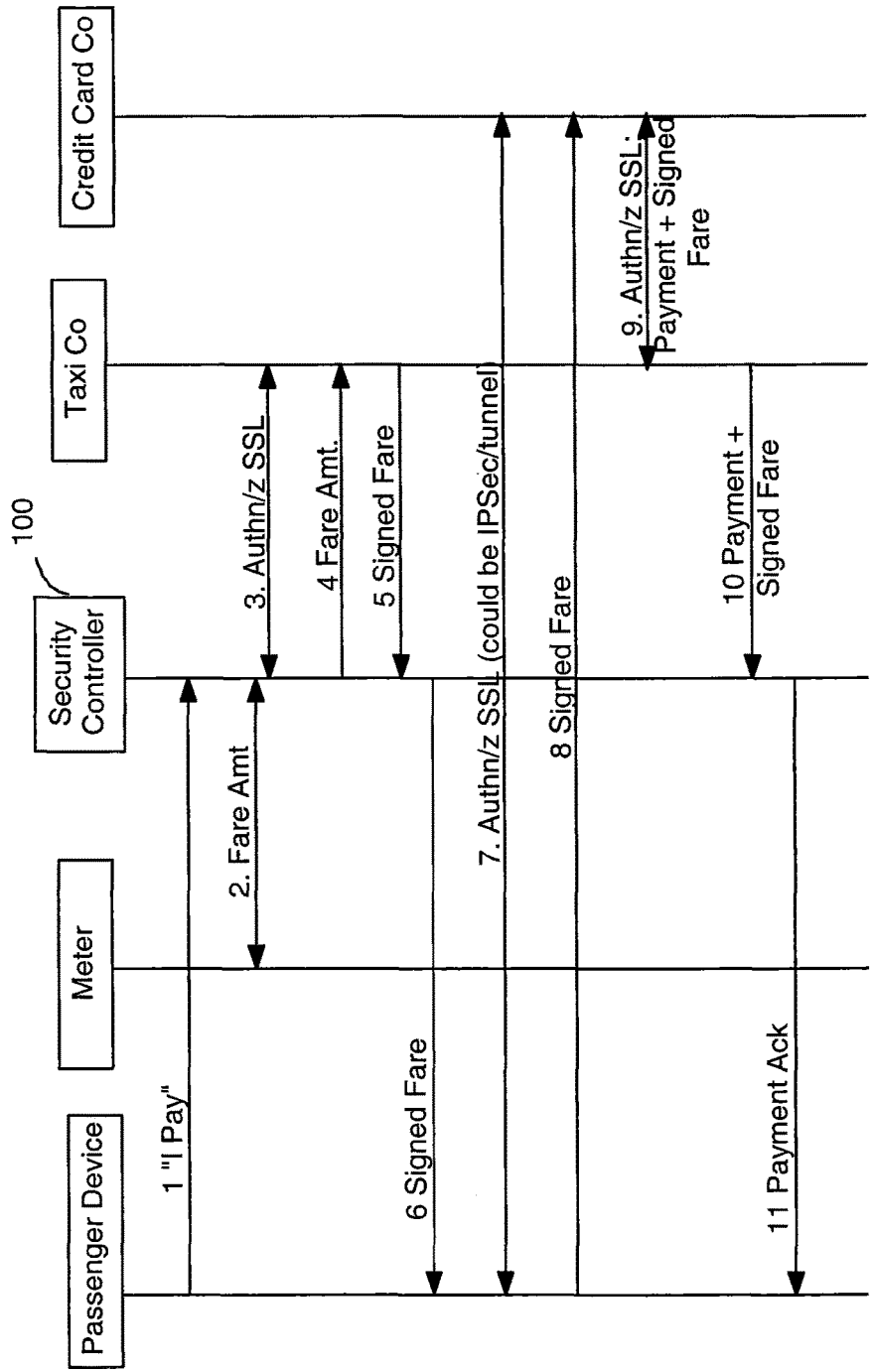
FIG. 6 is a diagram that illustrates steps and communications for securely making a transportation payment in a federated security framework.

Another anonymous transaction example is illustrated in FIG. 6. According to this scenario, a cab for hire is paid anonymously and the cab user or passenger receives a digitally signed receipt. The federation members include a financial institution, such as a credit card company and a public transportation or taxi company, as well as the vehicle resources including the security controller 100 and a vehicle user device that can contain an assertion repository 78. Due to the federation relationship between the credit card company and the taxi company, the cab driver does not need to know the identity of the cab user or credit card number and there need not be a trust relationship between the vehicle user and the taxi company. The steps and communications in this transaction include:

1. The security controller 100 in the cab is alerted that it will be the source for paying the cab fare using, for example, a laptop, a cell phone or other consumer device that contains the assertion repository 78 for the cab user.

2. Once the trip is completed, the fare amount is read from the cab meter by the security controller 100.

3. The security controller 100 establishes a secure authenticated connection with the cab company, which could be a pre-existing connection.

4. The fare amount, together with identifier for the cab, is sent to the cab company.

5. The cab company generates a signed or authorized fare assertion or reply.

6. The security controller 100 passes the assigned fare to the consumer device of the cab user.

7. The consumer device itself authenticates directly to the credit card company which authorizes payment or provides its indication that it has responsibility for paying the fare amount. It is preferable that this communication be SSL protected and, alternatively or optionally, the communication could be encrypted at the Internet protocol (IP) layer. This provides protection in the form of not permitting the taxi cab and any other passenger from getting information about the bank with whom the fare paying cab user is communicating.

8. The consumer device transmits the signed fare assertion to the credit card company.

9. The credit card company authenticates with the taxi company and makes payment based on the signed fare information.

10. The taxi company then sends an acknowledgment of payment to the security controller 100 in the cab.

11. The security controller 100 can then send payment acknowledgment to the consumer device.

In one embodiment, the fare assertion is an attribute assertion containing transaction information, the fare amount, the cab identifier and could also include other information such as the origin and destination of travel, with all such information being asserted or authorized by the cab company.

In another example of a federated environment that need not involve a payment as part of the user application, steps and communications are described to permit checking of the current location of a package or other item being shipped.

Figure 7:
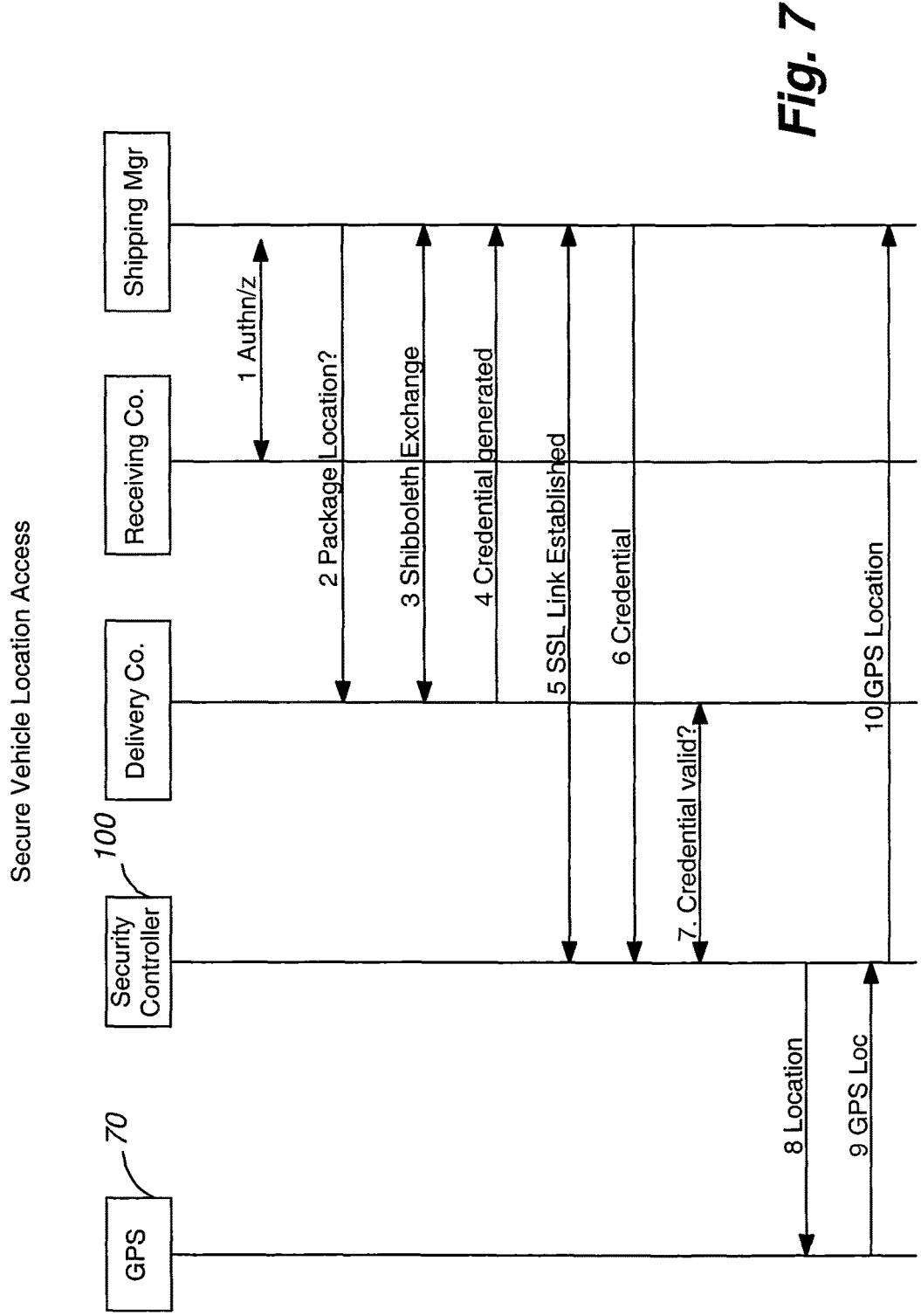
FIG. 7 is a diagram that illustrates steps and communications for securely obtaining vehicle location access information in a federated security framework.

With reference to FIG. 7, the company receiving the item and the delivery company have entered into mutually accepted conditions. These procedures or steps for this example include:

1. The shipping manager of the receiving company logs on to the company computer.

2. The shipping manager queries the delivery company for location of the shipment.

3. Information about the shipping manager is securely transferred to target web services that is to make the determination and provide the authorization to enable the shipping manager to obtain the location information. The transferred information about the shipping manager can include the identity of the receiving company, the role of the shipping manager at the shipping company and the item tracking number. With regard to transferring the information about the shipping manager, in one embodiment, a middleware software system or module could be employed identified as the Shibboleth architecture. The Shibboleth architecture is a known architecture that supports sharing of resources which are subject to access controls.

4. A signed or authorized assertion is generated by the target web services to which the information was directed. This signed assertion includes the security controller address of the vehicle containing the item, one or more credentials trusted by the security controller 100 that specify GPS access privileges and a unique session identifier or handle that links the shipping manager to the request in order to prevent unauthorized additional uses and/or other potential misuse.

5. Based on the address of the security controller 100 in the vehicle, a SSL session is established directly between the shipping manager and the security controller 100.

6. The credential(s) is (are) presented to the security controller 100, which performs relevant validity checks.

7. In one variation, the security controller 100 might contact the delivery company to verify the validity of the credential(s) and may request additional information about the vehicle location transaction. In such a case, the credential(s) need not include authentication and authorization information since these would be furnished by the delivery company.

8. The security controller 100 then requests the vehicle GPS coordinates.

9. These coordinates are returned to the security controller 100 in the vehicle from which location information is requested.

10. The GPS coordinates are sent to the shipping manager.

In a more significant variation of this example, the site of the receiving company might act as a front end portal for all interactions between it and the security controller 100. Alternatively as well, an estimated time of arrival could be provided to the shipping manager instead of the actual GPS location of the vehicle.

In still another example of a federation implementation, maintenance of a vehicle using a particular software diagnostic tool is described in conjunction with FIG. 8. In order to execute the vehicle diagnostic software tool, secure access to the bus of the vehicle is granted. The federation members include a vehicle dealer or maker and entities involved with vehicle maintenance, as well as the vehicle itself having the security controller 100. In one embodiment, the credentials for allowing use of this diagnostic software are generated by the vehicle dealer. The credentials might be specific for the particular vehicle and/or for a period of time. The sequence associated with this application includes:

1. The credentials associated with use of the software and concomitant access to the vehicle bus are loaded on a computer, such as a laptop, of the vehicle diagnostics entity in order to enable the software.

2. The diagnostic application on the computer establishes a secure session with the security controller 100 of the vehicle.

3. The diagnostic application presents the credentials to the security controller 100.

4. The security controller 100 establishes a secure connection with the dealer.

5. The security controller 100 presents the credentials contained in the software to the dealer for validation.

6. The dealer validates the credentials.

7. The security controller 100 might seek the vehicle owner's permission if access to the vehicle bus is granted by the vehicle dealer.

8. The vehicle owner grants access to the vehicle engine bus.

9. The security controller 100 accesses the vehicle engine bus and requests information.

10. The security controller 100 reads information from the engine bus.

11. The security controller 100 then transmits this information to the computer.

The process of obtaining information from the vehicle engine bus could be repeated numerous times after the credentials are validated. The credentials might allow the engine bus to be accessed for a defined period of time and/or a limited number of times. The credentials are preferably generated specific to each individual computer or other diagnostic device and not to the diagnostic software itself.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or uses. It is intended that the appended claims be construed to include alternative embodiments to the extent permitted by the prior art.

What is claimed is:

1. A communication system, comprising:
a security controller located within a first vehicle;
an assertion repository located within the first vehicle and interconnected to the security controller, wherein at least first and second keys are stored in the assertion repository;
a wireless communication device located within the first vehicle and interconnected to the security controller; and
a first proprietary resource located within the first vehicle and interconnected to the security controller, wherein the first proprietary resource is proprietary to a first entity,
wherein at least one of the wireless communication device or a second proprietary resource are proprietary to a second entity, wherein the security controller is operable to allow transmission of first information associated with the first proprietary resource from the wireless communication device in response to the security controller authenticating at least two of a number of factors associated with the system, wherein the first information is signed using the first key stored in the assertion repository in the first vehicle, and wherein the signed first information is transmitted by the wireless communication device.

2. The system of claim 1, wherein the factors associated with the system include an identity of the first vehicle, an identity of the wireless communication device, security information input by a user of the system, identification information of the user of the system, biometric information of the user of the system, location information, and time information.

3. The system of claim 1, wherein the information to be transmitted is addressed to a second vehicle.

4. The system of claim 1, wherein the wireless communication device is proprietary to the second entity.

5. The system of claim 1, wherein the wireless communication device located in the first vehicle and interconnected to the security controller is a first wireless communication device, the system further comprising:
a second wireless communication device, wherein the second wireless communication device is proprietary to the second entity.

6. The system of claim 5, wherein the first wireless communication device is proprietary to the first entity.

7. The system of claim 6, wherein the second communication device is interconnected to the security controller.

8. A secure delivery system, comprising:
a security controller located within a vehicle, the vehicle configured to carry an object for delivery to a delivery location;
an assertion repository located within the vehicle and interconnected to the security controller, wherein at least first and second keys are stored in the assertion repository;
a communication device located within the vehicle and interconnected to the security controller; and
a first proprietary resource located with the vehicle and interconnected to the security controller, the first proprietary resource including a global positioning system providing location information of the vehicle,
wherein the security controller is configured to sign the location information of the vehicle using the first key stored in the assertion repository in the vehicle and to deliver the location information of the vehicle through the communication device to an entity to which the object is being delivered based on the security controller authenticating information provided by the entity to which the object is being delivered.

9. The system of claim 8, wherein the information provided by the entity to which the object is being delivered includes one or more of an identity of a user associated with the entity to which the object is being delivered, security information input by the entity to which the object is being delivered, biometric information of a user associated with the entity to which the object is being delivered, and time information.

10. The system of claim 8, further comprising a second proprietary resource, the second proprietary resource providing status information of the vehicle.

11. The system of claim 8, wherein the information provided by the entity to which the object is being delivered includes location information provided by the entity to which the object is being delivered.

12. The system of claim 11, wherein the location information provided by the entity to which the object is being delivered corresponds to the delivery location.

13. The system of claim 12, wherein the information provided by the entity to which the object is being delivered further includes an additional factor.

14. A communication system, comprising:
a mobile communication device;
a first proprietary resource;
an assertion repository, wherein at least first and second keys are stored in the assertion repository; and
a security controller, wherein the mobile communication device, the first proprietary resource, the assertion repository and the security controller are co-located with each other,
wherein the security controller includes a processor and is configured to enable communications between the mobile communication device and the first proprietary resource, wherein such communications are enabled only when authenticated by the security controller, and
wherein, in response to a request from the mobile communication device that is authenticated by the security controller based on the receipt of at least a first assertion by the security controller, the security controller allows configuration information provided by the mobile communication device to be signed using the first key stored in the assertion repository and transmitted by the mobile communication device to the first proprietary resource.

15. The communication system of claim 14, wherein the security controller is located in a vehicle, and wherein the configuration information includes settings for the vehicle that are specific to a user of the mobile communication device.

16. The communication system of claim 15, wherein the mobile communication device includes a biometric input, and wherein the request from the mobile communication device is made after an identification of the user is received at the biometric input of the mobile communication device.

17. The communication system of claim 14, wherein the configuration information comprises at least one of driver identification, seat position, mirror positions, entertainment system presets, or climate control system settings.

18. The communication system of claim 14, wherein the mobile communication device, the first proprietary resource, and the security controller are located within a vehicle.

19. The communication system of claim 18, wherein the first proprietary resource includes a vehicle gateway device.

20. The communication system of claim 14, wherein the first proprietary resource is proprietary to a first entity, and wherein the mobile communication device is proprietary to a second entity.

* * * * *